(12) United States Patent
Ahmed et al.

(10) Patent No.: US 6,735,202 B1
(45) Date of Patent: May 11, 2004

(54) MOBILITY MANAGEMENT TECHNIQUES FOR USE IN AN INTERNET PROTOCOL-BASED MULTIMEDIA MOBILE NETWORK

(75) Inventors: Walid Ahmed, Eatontown, NJ (US); Bharat Tarachand Doshi, Holmdel, NJ (US); Hong Jiang, Westfield, NJ (US); Pantelis Monogioudis, Edison, NJ (US); Kiran M. Rege, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/480,022

(22) Filed: Jan. 10, 2000

Related U.S. Application Data

(63) Continuation-in-part of application No. 09/191,134, filed on Nov. 13, 1998, now Pat. No. 6,160,804.

(51) Int. Cl.$^7$ .............................................. H04L 12/28
(52) U.S. Cl. ..................... 370/392; 370/394; 370/401
(58) Field of Search ................................. 370/392, 393, 370/400, 401, 471, 394, 349, 384; 455/433, 456, 435

(56) References Cited

U.S. PATENT DOCUMENTS 6,195,705 B1 * 2/2001 Leung ........................ 709/245
6,584,098 B1 * 6/2003 Dutnall ....................... 370/354

OTHER PUBLICATIONS

Akyildiz, I.F., et al., "Mobility Management in Current and Future Communications Networks," IEEE Network, pp. 39–49, Jul./Aug. 1998.
Budka, K., et al., "Cellular Digital Packet Data Networks," Bell Labs Technical Journal, vol. 2, No. 3, Summer 1997.
"Cellular Digital Packet Data Systems Specification: Release 1.1," CDPD Forum, Inc., Chicago, 1995.
Corson, S., et al., "Mobile Ad Hoc Networking (MANET): Routing Protocol Performance Issues and Evaluation Considerations," draft–ietf–manet–issues–01.txt, Mar., 1998.
Wan, G., et al., "A Dynamic Paging Scheme for Wireless Communication Systems," ACM/IEEE MOBICOM '97, pp. 195–203, 1997.
"ISDN Based C Interface Access for PCS CDMA," Special Report SR–3797, Issue 1, Bellcore, Dec. 1995.
Perkins, C.E., et al., "Route Optimization in Mobile IP," draft–ieft–mobileip–optim–07.txt, Nov. 20th, 1997.
Perkins, C.E., "Mobile IP," IEEE Communications Magazine, pp. 84–89, May 1997.
Solomn, J.D., "Mobile IP: the Internet Unplugged," Prentice Hall, 1998.
Tabbane, S., "Evaluation of an Alternative Location Strategy for Future High Density Wireless Communications Systems," Wireless Information Network Laboratory, Jan. 1993.
Taylor, M.S., et al., "Internetwork Mobility The CDPD Approach," Prentice Hall PTR, Upper Saddle River, New Jersey 1996.

* cited by examiner

*Primary Examiner*—Duc Ho

(57) ABSTRACT

In a mobility management aspect of the invention, several unique mobility management control messages are defined for use in performing various mobility management functions in the communications system with respect to the mobile user stations and network nodes. These messages may comprise: (i) a Location Update Message (LUM); (ii) a Location Confirm Message (LCM); (iii) a Location Query Message (LQM); (vi) a Location Reply Message (LRM); (v) a Registration Message (RM); and (vi) a Registration Reply Message. One or more of these messages are used in the IP-based system to perform mobility management functions such as location management, mobile access and in-call mobility management.

42 Claims, 27 Drawing Sheets

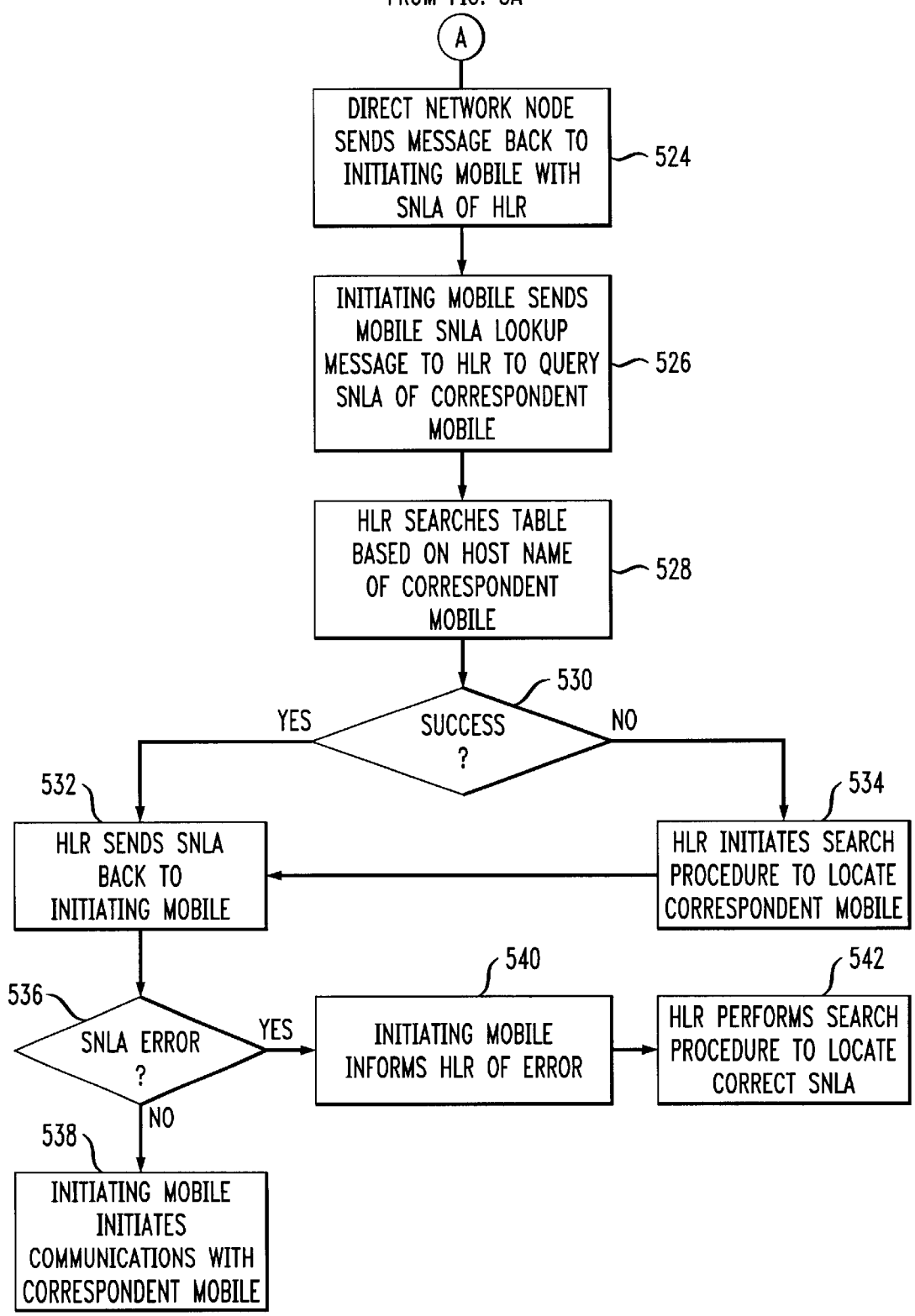

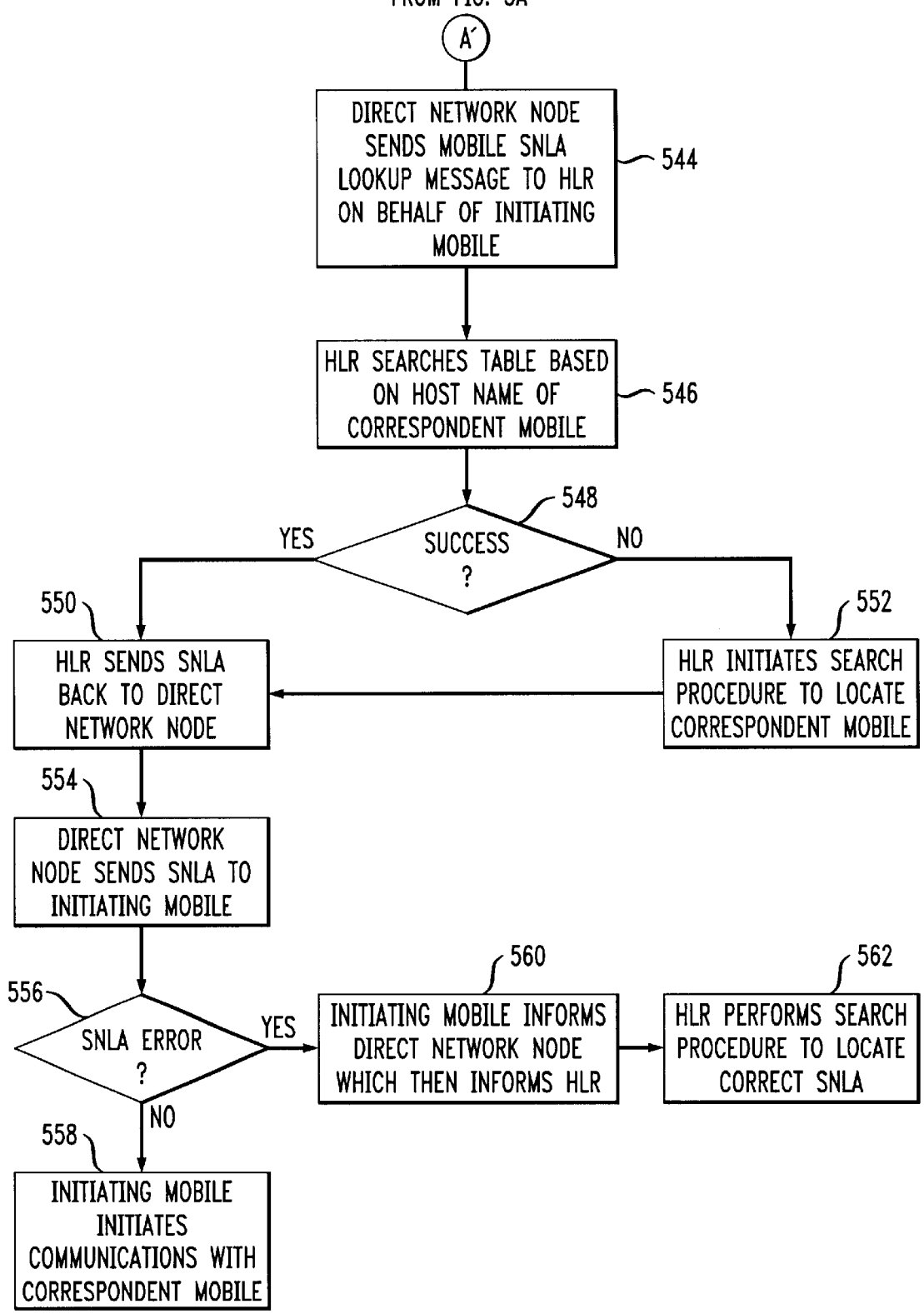

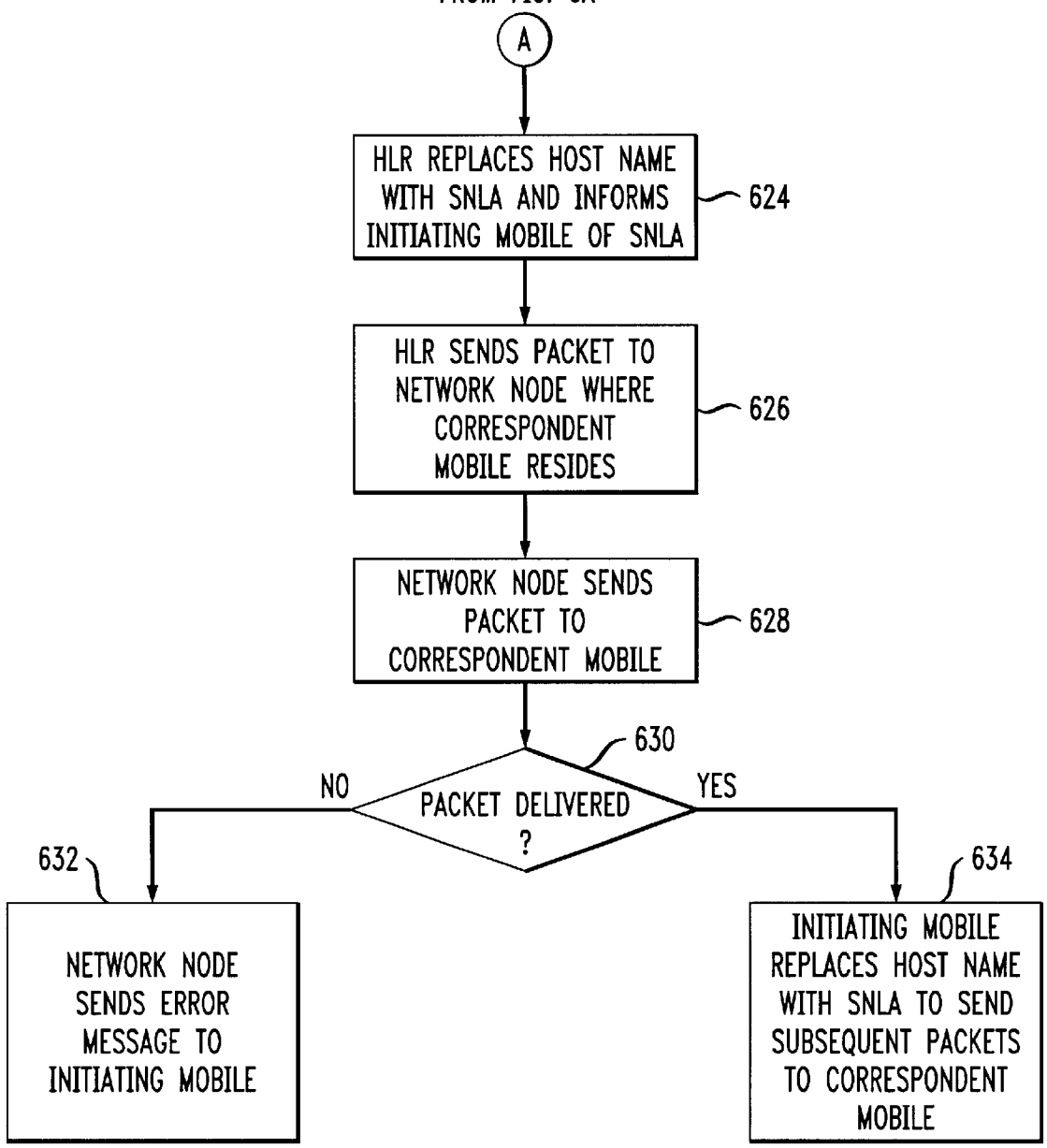

| TYPE | NUMBER OF LOCATION CONFIRMS | LOCATION CONFIRMS | ... |

| SEQUENCE NUMBER | RESERVED | UPDATE SOURCE | ... |

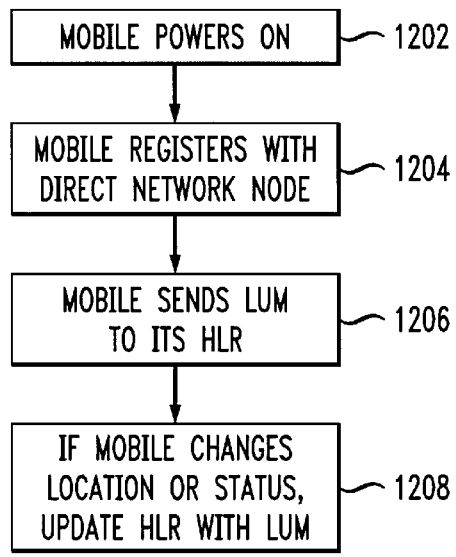
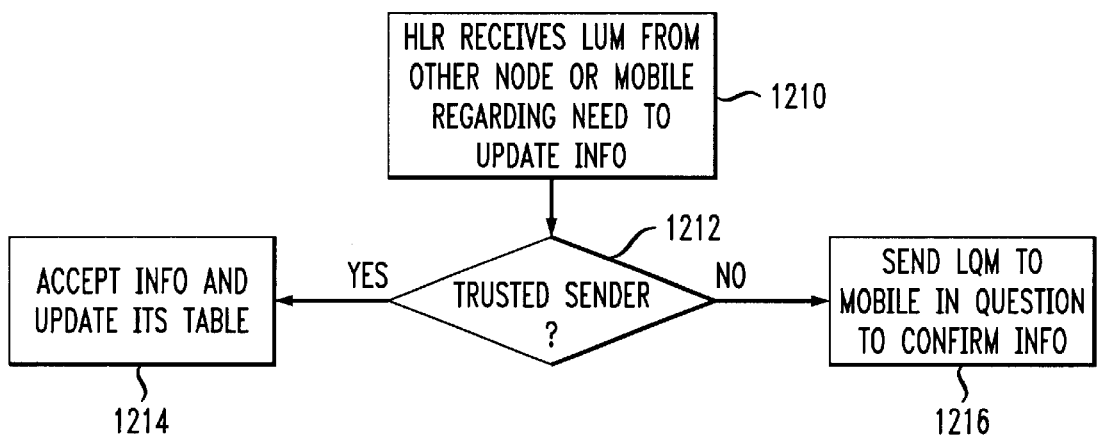

MOBILITY MANAGEMENT TECHNIQUES FOR USE IN AN INTERNET PROTOCOL-BASED MULTIMEDIA MOBILE NETWORK

CROSS REFERENCE TO RELATED APPLICATIONS

The present application is a continuation-in-part of U.S. patent application Ser. No. 09/191,134, filed on Nov. 13, 1998, which issued as U.S. Pat. No. 6,160,804 on Dec. 12, 2000, and is related to U.S. patent applications entitled "Addressing Techniques for Use in an Internet Protocol-based Multimedia Mobile Network," and "Address Option for Use in an Internet Protocol-based Multimedia Mobile Network," both filed concurrently herewith, the disclosures of which are incorporated by reference herein.

The U.S. Government has a paid-up license in this invention and the right in limited circumstances to require the patent owner to license others on reasonable terms as provided for by the terms of contract no. DAAB07-98-C-D009 awarded by the U.S. Army.

FIELD OF THE INVENTION

The present invention relates to mobile communications systems and, more particularly, to addressing and mobility management techniques in such systems that may include multimedia applications in a highly dynamic Internet Protocol-based networking environment.

BACKGROUND OF THE INVENTION

Several important mobility management issues need to be addressed in designing a communications system wherein the system is characterized by a dynamic network topology (e.g., mobile system access points or network nodes) and a relatively large number of mobile end users. Particularly, critical among them are issues such as: keeping track of mobile end users and access point locations in the system (i.e., location management); reaching and initiating communications with a mobile end user (i.e., mobile access); and continuity of service when a mobile end user moves between coverage areas associated with different system access points (i.e., handoff management). Existing networks have attempted to provide solutions to these problems in their specific domains. For example, limited solutions have been provided by Cellular Digital Packet Data (CDPD) networks, Cellular/Personal Communications Services (Cellular/PCS) systems, and Mobile Internet Protocol (mobile IP) networks. However, there are several known limitations to these conventional approaches owing to the fact that they were designed for different operating conditions.

A new multimedia mobile network that advantageously addressed the above and other issues while reducing and/or eliminating the drawbacks associated with the above-mentioned existing networks was disclosed in three U.S. patent applications identified by Ser. No. 09/191,133 (entitled: "Subnetwork Layer for a Multimedia Mobile Network"); Ser. No. 09/191,132 (entitled: "Addressing Scheme for a Multimedia Mobile Network"); and Ser. No. 09/191,134, now U.S. Pat. No. 6,160,804 (entitled: "Mobility Management for a Multimedia Mobile Network"), all concurrently filed on Nov. 13, 1998, the disclosures of which are incorporated by reference herein. The multimedia mobile network described in the above applications provides a network architecture and mobility management techniques that yield an efficient, scalable, and flexible communications system capable of handling various applications including multimedia applications.

Given a network with an architecture and mobility management techniques such as are associated with the above-mentioned multimedia mobile network, it would be highly desirable to provide methods and apparatus for implementing an improved Internet Protocol-based mobile network such as, for example, one that may be employed in accordance with an IPv4 standard. The IPv4 standard is described in J. Postel, "Internet Protocol," RFC 791, USC/Information Science Institute, September 1981, the disclosure of which is incorporated herein by reference.

SUMMARY OF THE INVENTION

The present invention provides addressing techniques and various mobility management methodologies, as well as apparatus for implementing them, in an Internet Protocol (IP) based mobile communications system. These techniques and methodologies are capable of supporting various voice and data services including, for example, multimedia services. The methods and apparatus are particularly well-suited for implementation in accordance with the IPv4 standard.

In one IP addressing aspect of the invention, a method for use in an Internet Protocol (IP) based communications system, comprises the steps of: (i) assigning a temporary location IP address (e.g., LIPA) to a mobile user station in the communications system, the address being a combination of an identifier of the mobile user station (e.g., MID) and an identifier of a network node in the communications system with which the mobile user station is currently associated (e.g., RID); and transferring packets to and from the mobile user station in accordance with the temporary location IP address. The method may further comprise the step of changing the temporary location IP address assigned to the mobile user station when the station becomes associated with another network node of the communications system, the changed address being a combination of the identifier of the mobile user station and an identifier of the new network node. The method may further comprise the step of assigning a location IP address to a network node in the communications system, the address being a combination of an identifier of the network node and a common identifier of mobile user stations in the communications system.

In another IP addressing aspect of the invention, a method for use in facilitating transfer of packets in an Internet Protocol (IP) based communications system, wherein the communications system includes a plurality of network nodes and a plurality of mobile user stations, comprises the steps of: (i) inserting an address option field in a packet header of a packet to be transferred in the communications system, the address option field including supplemental address related data for facilitating transfer of packets in the communications system; and (ii) processing the packet within at least one of a network node and a mobile user station in the communications system in accordance with the supplemental address related data in the address option field of the packet header. The address option field may comprise an address type field, an address length field and an address data field. Various address related data may be included in the address data field to facilitate transfer of packets in an IP-based communications system.

In a mobility management aspect of the invention, several unique mobility management control messages are defined for use in performing various mobility management functions in the communications system with respect to the mobile user stations and network nodes. These messages may comprise: (i) a Location Update Message (LUM); (ii) a Location Confirm Message (LCM); (iii) a Location Query Message (LQM); (iv) a Location Reply Message (LRM); (v) a Registration Message (RM); and (vi) a Registration Reply Message. One or more of these messages are used in the IP-based system to perform mobility management functions such as location management, mobile access and in-call mobility management.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 5A through 5C are flow charts of mobile access methods according to embodiments of the present invention;

FIGS. 6A and 6B is a flow chart of a mobile access method according to another embodiment of the present invention;

FIGS. 12A through 12C are flow diagrams illustrating exemplary location management techniques according to the present invention;

DETAILED DESCRIPTION OF PREFERRED EMBODIMENTS

The present invention will be illustrated below in conjunction with an exemplary Internet Protocol-based wireless communications system in which not only are end user terminals mobile, but in which system access points, referred to hereinafter as network nodes, are also mobile. It should be understood, however, that the invention is not limited to use with this particular system, but is instead more generally applicable to any multiaccess communications system with or without mobile network nodes. Further, the term "processor" as used herein is intended to include any processing device, including a CPU (central processing unit), which may be utilized in a mobile station or network node. Also, the term "memory" as used herein is intended to include memory associated with a processor or CPU, such as RAM, ROM, a fixed memory device (e.g., hard drive), or a removable memory device (e.g., diskette). In addition, the processing unit may include one or more input devices, e.g., keypad or keyboard, for inputting data to the processing unit, as well as one or more output devices, e.g., CRT display, for providing results associated with the processing unit. Accordingly, software instructions or code for performing the methodologies of the invention, described herein, may be stored in one or more of the associated memory devices (e.g., ROM, fixed or removable memory) and, when ready to be utilized, loaded into RAM and executed by the CPU.

The remainder of the detailed description will be divided as follows: (I) Network Component Arrangement; (II) Network Architecture; (III) Subnetwork Addressing Scheme; (IV) Mobility Management; (V) IPv4 Implementation of Subnetwork Layer Addressing; (VI) IPv4 Implementation of Mobility Management; (VII) Direct Router Failure for IPv4 Implementation; (VIII) Registration Retransmission for IPv4 Implementation; and (IX) Quality of Service for IPv4 Implementation.

It is to be understood that sections (I) through (IV) describe the multimedia mobile network as disclosed in the three above-referenced U.S. patent applications identified by Ser. No. 09/191,133 (entitled: "Subnetwork Layer for a Multimedia Mobile Network"); Ser. No. 09/191,132 (entitled: "Addressing Scheme for a Multimedia Mobile Network"); and Ser. No. 09/191,134, now U.S. Pat. No. 6,160,804 (entitled: "Mobility Management for a Multimedia Mobile Network"). Sections (V) and (IX) describe a multimedia mobile network such as that described in sections (I) through (IV) which is inventively adapted to implement the IPv4 standard.

I. Network Component Arrangement

Figure 1:
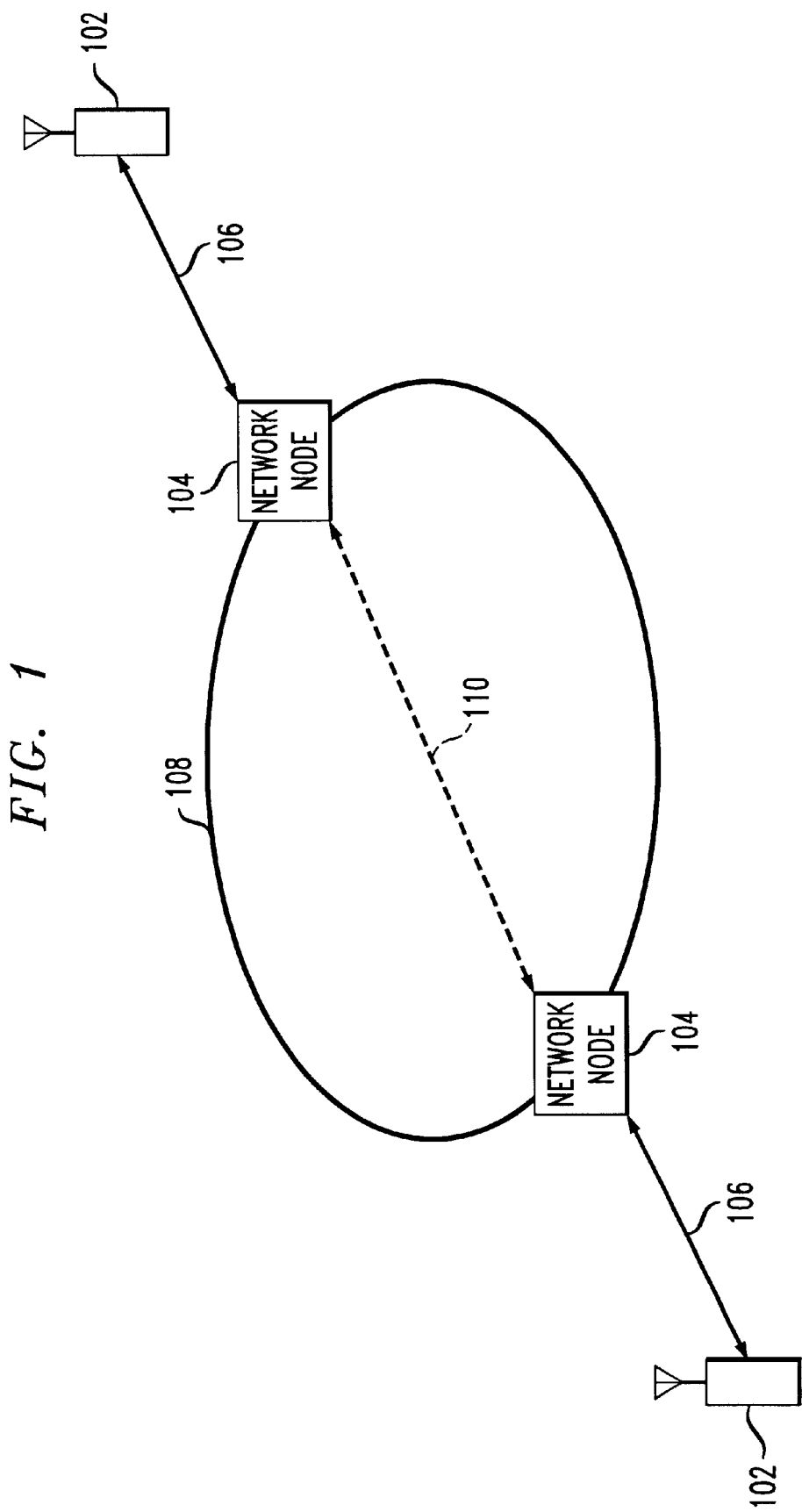
FIG. 1 is a block diagram of a mobile communications system according to an embodiment of the present invention.

Referring initially to FIG. 1, a block diagram of an illustrative mobile communications system 100 according to the present invention is shown. Particularly, mobile end users 102, hereinafter referred to as "mobile stations" (MSs), "mobile terminals," or, more simply, "mobiles." are operatively coupled to network nodes 104 via links 106. Like the mobiles 102, the network nodes 104 preferably have the ability to move. The network nodes 104 are operatively coupled to each other via an internode or backbone network 108. While FIG. 1 illustrates two mobiles and two network nodes, it is to be appreciated that the system 100 can accommodate many mobile end systems 102 (e.g., about one quarter of a million) and many network nodes 104 (e.g., about one thousand).

The internode network 108 includes a plurality of network nodes 104 preferably interconnected with point-to-point wireless links 110. It is to be appreciated that each network node 104 serves as both a base station to the mobiles 102 directly communicating therewith and as an intermediate router for packets passing therethrough. That is, each network node provides wireless access to the mobile terminals and also acts as a switch. Some of the network nodes are preferably connected via satellite or terrestrial links to external networks, e.g., fixed networks (not shown). These nodes have the additional functionality of a "gateway" which provides the interworking functions to maintain consistency with the protocols used in these external networks. Also, it is through the internode network 108 that the system connects with various service providers (not shown) capable of providing various multimedia-based services to the mobiles 102. Further, some of the network nodes may be airborne. Mobiles may move from the coverage area associated with one network node to the coverage area of another network node. Because the network nodes, like the mobile stations, are mobile, the system 100 is characterized by a constantly changing topology.

As mentioned, network nodes are inter-connected with point-to-point wireless links. Also, these nodes are preferably equipped with a topology sensing scheme which enables them to sense the presence of other nodes as they move closer. The nodes use certain rules to select which of their neighboring nodes they should have links with. The idea is to enable nodes to establish links with their nearest neighbors (e.g., in terms of path loss) subject to certain connectivity requirements.

The system 100 provides connectionless switching between its end-points. That is, even for connection-oriented services (e.g., any TCP/IP applications, voice call applications, video sessions, etc.), there are no virtual circuits between the network nodes providing access to the mobile terminals involved in that call. The use of connectionless switching within the system 100 is preferred for at least the following reason: given the highly dynamic nature of the network topology, inter-node links are set up and torn down rather frequently and, as such, in the case of virtual circuit switching, this would necessitate the reestablishment/ redirecting of a large number of virtual circuits (over new paths). However, with connectionless switching, changes in topology result only in changes in routing tables which can be handled much more efficiently than redirecting virtual circuits.

Figure 2:
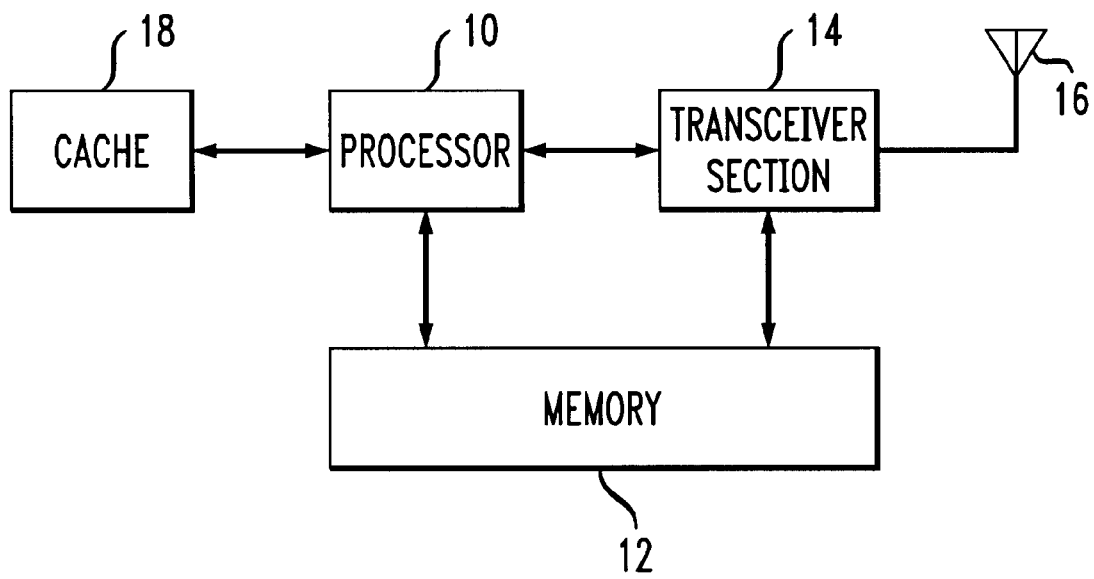
FIG. 2 is a block diagram of a hardware implementation of a mobile station and a network node according to an embodiment of the present invention.

Referring to FIG. 2, a block diagram of an exemplary hardware configuration of a mobile station 102 and a network node 104 is shown. Specifically, a processor 10 for controlling the operations, described herein, of either the mobile station or the network node is operatively coupled to a memory 12, a transceiver section 14, and a cache 18. An antenna 16 is operatively coupled to the transceiver 14. The processor 10 executes the methodologies associated with the mobility management schemes described herein in cooperation with memory 12. As will be explained, a separate cache 18 is preferably provided for handling certain functions associated with the invention. The transceiver 14 and antenna 16, as is known, provide wireless connection to other elements of the system, e.g., between a mobile station 102 and a network node 104. The transceiver 14 contains a modem, which is configured to transmit and receive signals in a manner compatible with the air links employed. It is to be appreciated that the transceiver section 14 in a mobile may include more than one transmitter and receiver such that the mobile may communicate with more than one network node at a time over different frequency bands.

II. Network Architecture

Figure 3A:
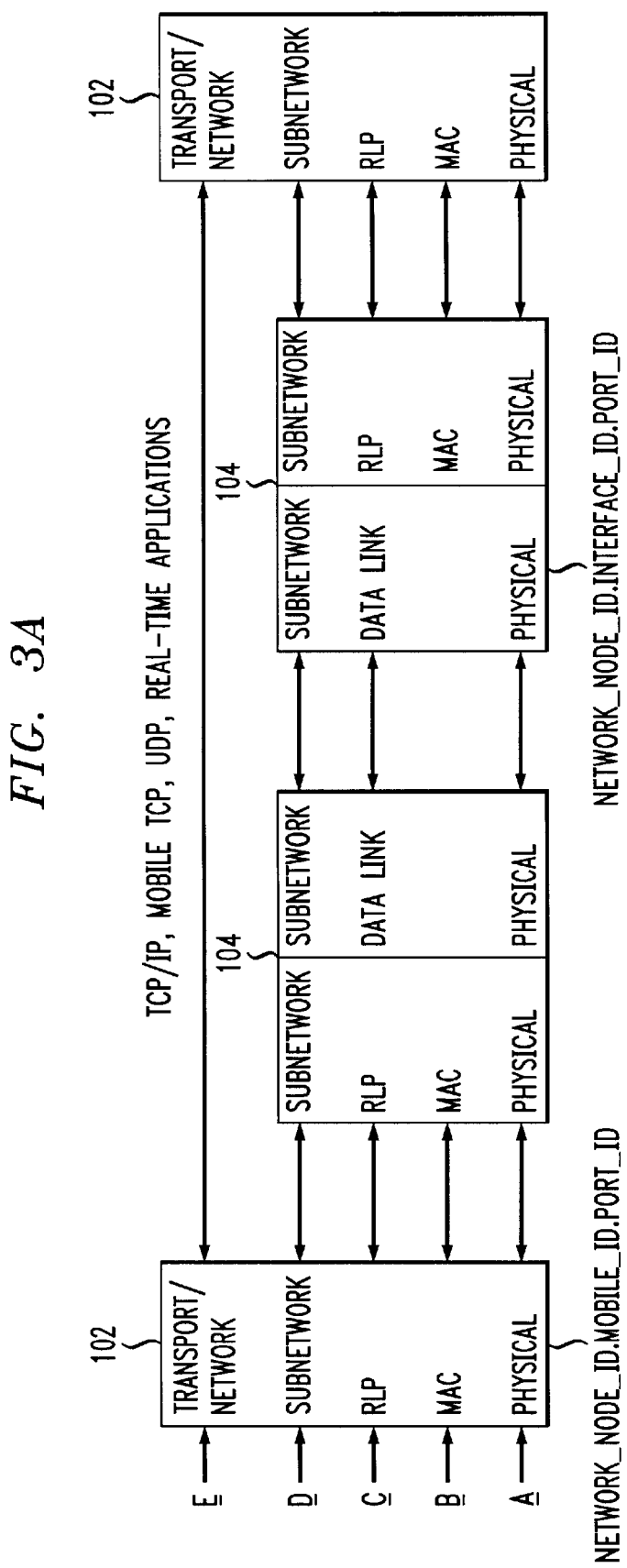
FIG. 3A is a block diagram of a protocol architecture of a mobile communications system according to an embodiment of the present invention.

Referring now to FIG. 3A, a layer-oriented protocol architecture according to the present invention is shown. It is to be understood that network nodes 104 provide network access to mobile stations 102 via a multiple access protocol. The multiple access protocol preferably provides shared, contention-based channels as well as reserved channels. The contention-based channels are used for control and signaling messages as well as for sporadic connectionless data. The reserved channels are used for those connections that require larger or guaranteed bandwidths or have strict delay requirements. Recall that within the internode network we have connectionless switching. Thus, in the case of connection-oriented applications, the connections can be identified in the access segments where there are resources dedicated on a per connection basis.

There are two distinct connection segments in the system 100 (FIG. 1). The first segment is the wireless access segment, i.e., links 106, which connects mobiles 102 with network nodes 104 and the second segment is the internode network 108 consisting of network nodes connected together with relatively high quality point-to-point links, i.e., links 110. The wireless access segment is preferably a shared multiple access medium in the reverse (uplink) direction and a broadcast medium in the forward (downlink) direction. "Uplink" refers to a signal path from a mobile station to a network node, while "downlink" refers to a signal path from a network node to a mobile station. For this segment, a media access control (MAC) layer protocol (denoted as reference designation B in FIG. 3A) is employed on top of a Physical layer (denoted as reference designation A in FIG. 3A) to allow meaningful statistical sharing of bandwidth among the large number of mobile terminals 102 that could potentially be attempting to access the system 100 through a network node 104. The broadcast nature of the downlink which is being listened to by all of these terminals can be exploited to provide instructions/feedback to the terminals to improve the efficiency of the MAC layer protocol. The MAC layer protocol achieves these objectives in an efficient manner. The wireless access segment is preferably a TDMA/ FDM (time division multiple access/frequency division multiplexing) scheme in that different nodes likely to interfere with each other minimize interference by using different frequency bands (FDM) and, within the frequency band being used by a network node, transmission takes place in a slotted mode (TDMA) to create multiple channels. However, it is to be appreciated that a code division multiple access (CDMA) based scheme, or some other suitable scheme, may be employed to allow shared access to the system. It is also to be appreciated that the internode network 108, including links 110 between the network nodes may, for example, be TDMA/FDM-based, TDMA-based, CDMA-based, or some other suitable scheme.

The MAC layer allows reserved channels for those connections that need a guaranteed bandwidth and frees up the remaining bandwidth for shared contention based access making for an overall efficient operation. While the MAC layer is concerned with sharing the available bandwidth efficiently, it is not necessarily equipped to handle error control. In a high quality medium where bit or block errors are rare, it is possible to carry higher layer protocols directly on top of the MAC layer and allow the error control mechanisms built into the higher layer protocols to handle transmission errors. For instance, in local area networks with low bit error rates it is customary to carry Transmission Control Protocol/Internet Protocol (TCP/IP) directly over the MAC layer and allow the error recovery mechanisms of TCP to handle transmission errors. The wireless access medium, on the other hand, is characterized by significantly high error rates and fading (which also contributes to burst errors). Carrying higher layer protocols such as TCP/IP directly over the MAC layer in such a medium is likely to result in poor throughputs and large delays—an overall inefficient operation. Consequently, a Radio Link Protocol (RLP) layer (denoted as reference designation C in FIG. 3A) is provided on top of the MAC protocol over the wireless access segment. It is to be appreciated that the RLP layer is essentially a "conversion layer" that helps adapt the communication medium represented by the lower (MAC and Physical) layers to the requirements of the higher layer protocols (IP and above).

The RLP is mainly concerned with overcoming the effects of transmission errors in the wireless access segment to create a virtually error-free data link for those applications that require low end-to-end error rates. This is preferably achieved through a combination of error correction/detection schemes with Automatic Repeat Requests (ARQ) or Selective Repeat transmissions for error recovery over the access segment. The RLP also preferably performs segmentation and re-assembly functions to rebuild the frames handed down to it by the higher layer protocols before forwarding them to the protocol stack that will be active in the internode network.

Further, assume that the higher layer protocols are TCP at the transport layer and IP at the network layer (denoted as reference designation E in FIG. 3A). Thus, a Subnetwork layer server module in a mobile receives an IP frame for transmission from the higher layers. Now comes the issue of possible segmentation at various protocol boundaries because of different frame sizes at different layers. IP frames are typically thousands of bits long. On the other hand, the frame size for the RLP layer, which is determined by factors pertaining to the wireless access segment between mobile terminals and network nodes, is typically only a few hundred bits. In between the IP and RLP layers, the Subnetwork layer frame size is optimized for efficient transport over the internode network. This is somewhere between the RLP frame size and the IP frame size. Therefore, if the Subnetwork layer frame size is smaller than the IP frame size, the IP frame received by the Subnetwork layer is segmented, a Subnetwork layer header/trailer is added to each segment to form a Subnetwork layer frame, and then each Subnetwork layer frame is handed to the RLP layer server module. The RLP layer server module segments each Subnetwork layer frame into several subframes, then adds RLP sequence numbers, encodes these subframes for error correction/detection, and then hands them down to the MAC layer for individual transmission. The subframe size at the RLP layer is specified such as to fit into a MAC layer slot so that segmentation/re-assembly is not required at the interface between two layers. At the receiver (receiving end of the access segment, that is, in the direct network node), the MAC layer passes the subframes, corresponding to each connection, to an RLP server which checks them for possible transmission errors and sends error feedback (e.g., similar to ARQ or selective repeat) piggybacked on to frames going in the opposite direction over the same connection. When the RLP server (at the receiver side) has all of the subframes corresponding to a Subnetwork layer frame handed down to the RLP server on the transmitter side, it re-assembles the subframes into a frame and passes it on to the router module for routing within the internode network. It is to be appreciated that routing in the internode network takes place at the Subnetwork layer. Re-assembly of IP layer frames (if they are segmented into several Subnetwork layer frames) is carried out at the remote host where the IP layer is terminated.

The error control functions such as ARQ, retransmission, etc., carried out by the RLP may introduce a certain delay which may not be acceptable for many real time applications such as voice communications. Also, many of these applications are tolerant of frame errors provided the frame error rate is within a certain permissible limit. For such connections, a real time version of RLP which does not have the ARQ/retransmission functions, but, perhaps, may have additional coding for better protection against transmission errors may be employed.

As mentioned, connectionless switching is preferably employed within the inter-node network 108. Since many of the applications in the end-systems may be based on TCP/IP or User Datagram Protocol/Internet Protocol (UDP/IP) it would appear proper, at first glance, to employ connectionless switching based on IP within the inter-node network. However, in a highly mobile environment such as system 100, conventional IP-based routing, even with the enhancements added by Mobile IP, introduce many inefficiencies (e.g., triangular routing and frequent registration) in the overall operation.

Consequently, the network architecture of the present invention advantageously includes a Subnetwork protocol layer (denoted as reference destination D in FIG. 3A). The Subnetwork layer, as will be explained below, is included specifically to handle mobility management and other functions, as will be explained, in the system 100. For instance, the Subnetwork layer of the invention handles all aspects of mobility including "within call" or "in-call" mobility, thus off-loading the higher layers of mobility related concerns. This enables applications based on standard protocols such as TCP/IP to be run smoothly over the system 100 without the need for any modifications. The switching/routing functions within the internode network 108 are connectionless in the sense that there are no virtual circuits associated with connections in the internode network. However, the Subnetwork layer of the invention enables end-points of a connection (located in the nodes used for access to the internode network) to keep track of each other in the system 100.

To summarize, the main and preferred functions to be carried out by the various layers of the protocol stack of the invention, as shown in FIG. 3A, are as follows: (i) Physical Layer provides modulation, framing, synchronization, equalization, channel adaptation, and raw transport; (ii) MAC Layer provides channel arbitration, provides shared access to mobile terminals, ensures efficient use of the available bandwidth, helps maintain QoS (Quality of Service) by providing reserved bandwidth to real time applications, low level resource negotiation, and frees up unused bandwidth for contention based access (for efficiency); (iii) RLP Layer provides QOS support through error control via coding, interleaving, ARQ/Selective Repeat schemes to create a virtually error free bridge across the access segment for applications with low error rate requirements, segmentation and re-assembly to help rebuild the frames transmitted by the higher layers, ensures efficient use of the communication medium by intelligent means of error recovery, provides call/connection setup and termination procedures for the access segment, and provides signaling for resource negotiation during a call; and (iv) Subnetwork Layer provides, inter alia, connectionless switching/routing within the internode network, provides mobility support to applications running across the system 100 (mobility support includes, inter alia, address queries during call setup as well as destination tracking during a call), hides mobility related issues from higher layer (IP and above) protocols to ensure smooth working in a mobile environment.

Figure 3B:
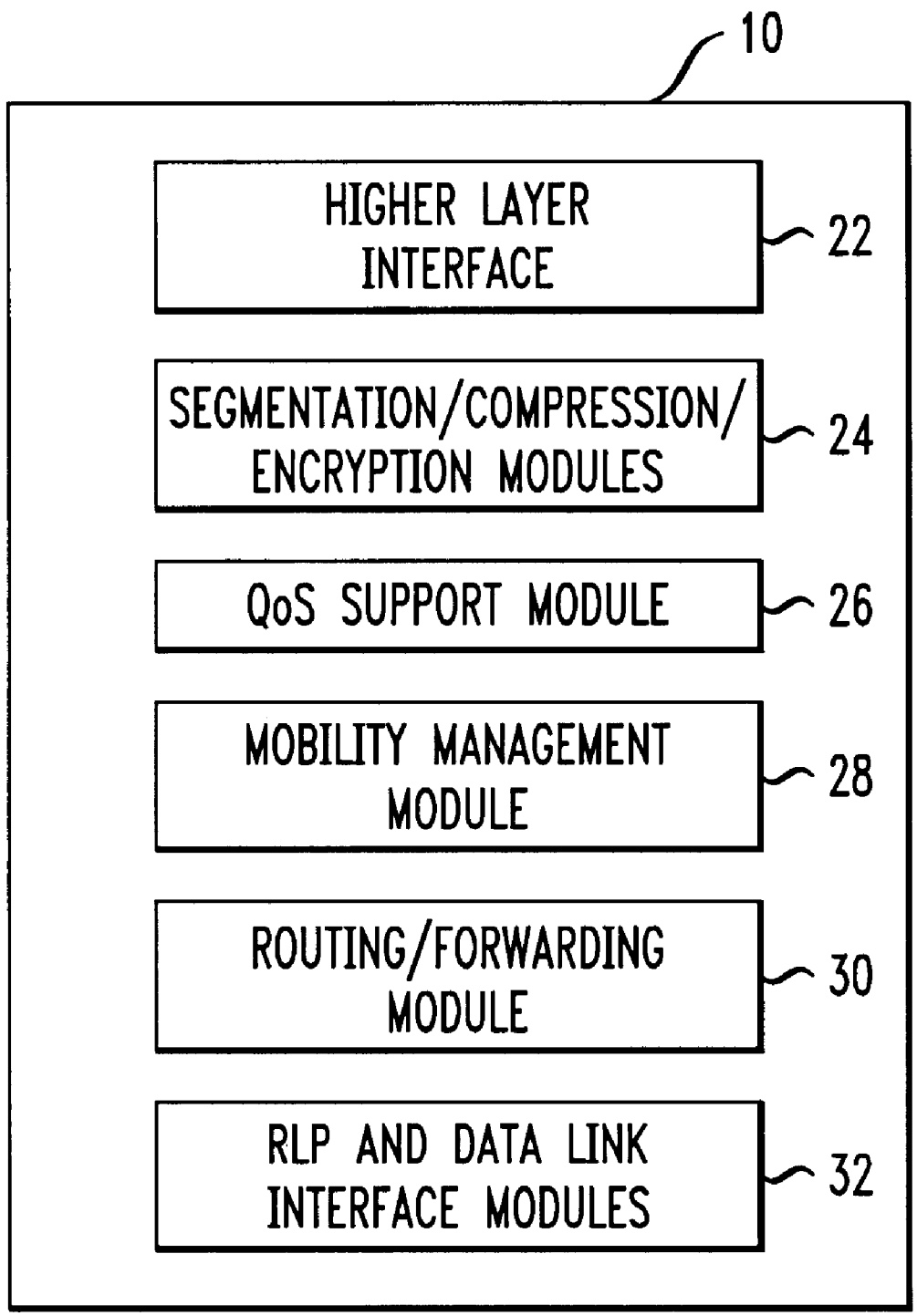
FIG. 3B is a block diagram illustrating processing modules associated with a subnetwork layer according to the invention.

Referring now to FIG. 3B, a block diagram of functional processing modules associated with the Subnetwork layer D according to an embodiment of the invention is shown. It is to be appreciated that the functional processing modules are executed on the processor 10 (FIG. 2) in cooperation with the memory 12, transceiver section 14, antenna 16, and cache 18. Alternatively, each module may have its own dedicated processor or two or more functional modules may share a processor. It is also to be appreciated that these functional processing modules reside in both a mobile 102 and a network node 104.

The Subnetwork layer D also functions as a convergence layer, which supports higher network layers such as TCP/IP, UDP, and mobile TCP. Interface to such higher layer is through a higher layer interface module 22 (FIG. 3B), which provides interface functions, as known in the art, for the Subnetwork layer. However, it is to be appreciated that a network layer above the Subnetwork layer D is optional in that the Subnetwork layer may directly support a transport/network protocol. The segmentation, compression, and encryption modules 24 provide their respective functions as are known in such a packet-based environment. The RLP and Data Link interface modules 32 respectively provide interfacing functions to the RLP layer, described herein, and data transition between the Subnetwork layer and the physical data link between a mobile and a network node. QoS (quality of service) module 26 allows differential treatment of packets based on their QoS requirements (e.g., delay, etc.).

As will be explained below, the mobility management module 28 in cooperation with the routing/forwarding module 30 provides various mobility management methodologies, as described herein, according to the invention. Depending on the configuration of the system 100, as will also be explained below, a handoff manager module is an integral part of the mobility management module 28. However, alternatively, the handoff manager module may operate via a dedicated processor. Also, while a routing processor is generally described, it is to be understood that the invention may employ source routing and may also support other data transfer methods such as, for example, tunneling, as is known in the art. Accordingly, the Subnetwork layer of the invention avoids the need for employing triangle routing of bearer traffic by using minimal signaling during call/connection setup and handoff. That is, once a call/connection is setup, packets travel over a direct path throughout the system 100.

III. Subnetwork Addressing Scheme

The present invention provides a novel temporary-addressing scheme for the Subnetwork layer to facilitate, inter alia, routing and mobility management. Based on the temporary addresses alone, packets are routed to the destination mobiles. Additionally, during a connection/call, temporary addresses are used for route optimization as mobiles move. This addressing scheme also allows a host (e.g., mobile station) to detect the mobility of its correspondent host (e.g., mobile station) during a connection/call. A Subnetwork Layer Address (hereinafter referred to as SNLA) of a network node 104 preferably has the format of network_node_ID.interface_ID.port_ID, which does not change as the network node moves in the network, except when port designations associated with a transfer, as explained below, change. The first part of the address (i.e., to the left of the first period) is the ID (identification or identifier) of a network node. Each network node in the system 100 has its own unique ID. The second part of the address (i.e., between the first period and second period) is the ID of an interface at the network node. Such field supports the case where each interface associated with a network node needs to be identified by its own SNLA. That is, the interface ID portion of the address is used to identify the interface within the network node that the packet is being directed to. An interface in a network node refers to an end, at the node, of a physical link (e.g., point-to-point) between the network node and a neighboring node. For example, a network node may be coupled to three other network nodes and, thus, have three unique interface IDs, one for each link. It is to be appreciated that the interface ID may be a data link address associated with the particular link. The third part of the address (to the right of the second period) is the ID of the port, which identifies the application flow at the network node. In other words, this field identifies the particular application flow with which the packets being directed are associated, e.g., connection-based applications, such as voice or video, or connectionless applications, such as e-mail. It is to be appreciated that the port ID allows intermediate routers to identify an application flow and perform application-level flow-based operations such as mobility management and QoS routing. However, if communicating mobiles do not assign port IDs for an application flow, a default value is used. Application-level flows can be identified at a granularity of source and destination. Also, application-level flows can be identified at a higher network level.

On the other hand, the SNLA of a mobile station 102 preferably has the format of network_node_ID.mobile_ID.port_ID. The first part of the address (i.e., to the left of the first period) is the ID of the network node with which the mobile is currently associated. The second part of the address (i.e., between the first period and second period) is the ID of a mobile, which, like a network node, has a unique ID as compared to other mobiles in the system 100. The third part of the address (to the right of the second period) is the port ID that identifies an application flow on the mobile. It is to be appreciated that the port ID associated with each network node address and each mobile address is unique depending on the application. Thus, for each application flow (connection-based or not), the port ID is dynamically assigned by each element (e.g., mobile or network node).

It is to be appreciated that the network node 104 currently in direct communication with the mobile 102 is referred to as the mobile's direct network node. As a mobile 102 moves from one network node 104 to another, its network node ID part of the SNLA changes from the ID of the old network node to the ID of the new network node. Therefore, a mobile's SNLA advantageously indicates the relative location of a mobile. Given a mobile's SNLA, packets with this SNLA as the destination are routed first towards the direct network node indicated by the SNLA and then further forwarded by the direct network node to the mobile. The network node IDs and mobile IDs are unique among themselves, respectively. In one embodiment, the mobile IDs use the mobiles' MAC addresses. However, other unique identifying schemes may be employed and are thus contemplated by the invention. Advantageously, having a unique mobile ID allows the mobile to be recognized by its correspondent mobile when its SNLA changes or when it obtains multiple SNLAs. It is to be understood that because a mobile may be in communication with more than one network node at a time (e.g., during soft handoff), the network node ID portion of the mobile's SNLA is different for each network node and, thus, the mobile has more than one SNLA associated therewith.

Given such a novel Subnetwork layer and temporary addressing scheme of the invention, as explained above, the present invention provides various methodologies for carrying out/performing mobility management in the system 100. Such methodologies are functionally divided and described below in corresponding sections of the detailed description. Specifically, mobility management according to the invention is explained according to three separate functions: (IV-A) location management; (IV-B) mobile access; and (IV-C) in-call mobility management.

IV. Mobility Management

A. Location Management

Figure 4:
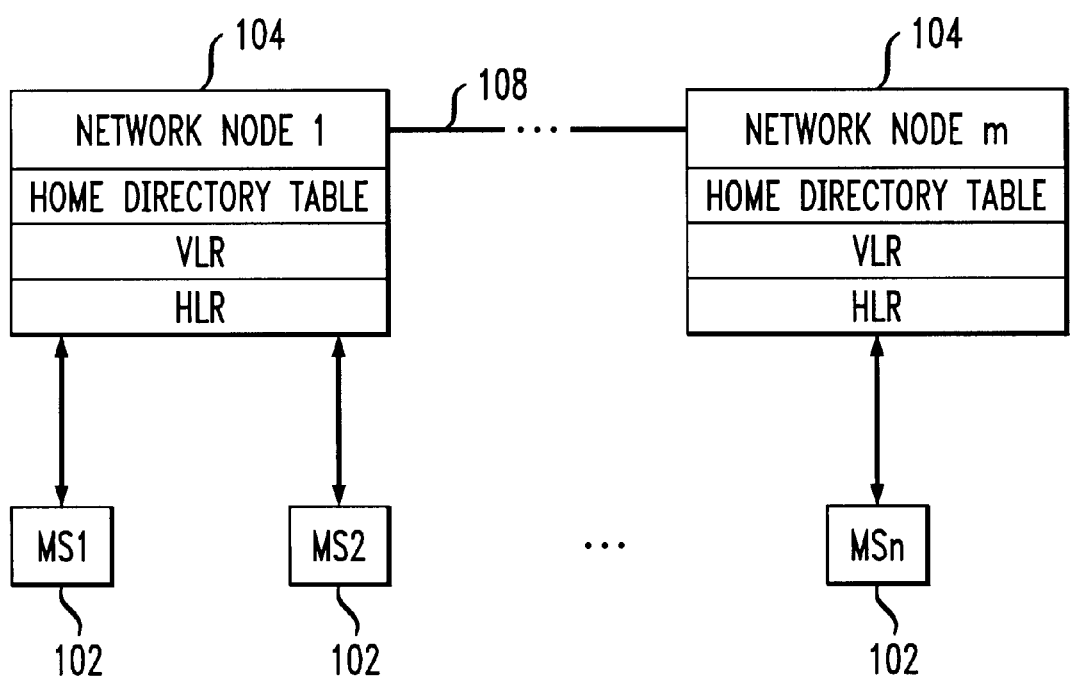
FIG. 4 is a block diagram of a portion of a mobile communications system illustrating location management according to an embodiment of the present invention.

Location management is concerned with keeping track of mobiles' locations and searching for the mobiles when the system 100 loses track of them. The present invention provides an approach where Home Location Registers (HLRs) and Visitor Location Registers (VLRs) are used to track the locations of individual mobiles. Referring to FIG. 4, a block diagram illustrating elements involved in location management in system 100 is shown. It is to be understood that there are preferably a plurality of HLRs in system 100. While an HLR can reside on any network node, it is to be appreciated that the location and the number of the HLRs may impact the performance of mobility management. Therefore, depending on the number of mobiles and network nodes in the system, certain network nodes include an HLR. In the case shown in FIG. 4, network node 1 and network node m include an HLR. Each mobile station (MS) is assigned an HLR. A table (e.g., Table I) is stored in the HLR containing the following fields: mobile's host name, mobile's unique ID, mobile's SNLA(s), the time the entry was created and the expiration time.

TABLE I

| Mobile Hostname | Mobile ID | Mobile SNLA | Entry Time | Expiration Time |
|---|---|---|---|---|
| host1.org1.mil | 356778 | 2041.356778.0 | 6:00:00 | 9:00:00 |
| host2.org1.mil | 356706 | 2041.356706.0 | 4:11:35 | 7:00:00 |
| host1.org2.mil | 350012 | 2041.350012.0 | 3:01:47 | 6:00:00 |
| host2.org2.mil | 350051 | 2041.350051.0 | 5:00:00 | 8:00:00 |

The first two fields are unique and serve as keys for searching the table. Note that the HLRs maintain the location of a mobile only through the network node it is currently attached to i.e., the direct network node. Only if the mobile's point of attachment changes, then the mobile's HLR needs to be updated. The relative movement among network nodes does not affect the mobiles' HLRs though it will invoke routing updates. If a mobile moves to another network node, either the mobile or the direct network node sends a location update message to its HLR. Also, a network node itself may move out of range, losing all mobiles attached to it. In this case, the mobiles will try to connect with the neighboring nodes. Depending on the availability, some mobiles may be able to connect to the neighboring nodes. To minimize the number of location update messages, each neighboring node sends location update messages to the HLRs of all the newly joined mobiles (via the internode network 108), lumping the mobiles that belong to the same HLR together in one location update message.

Next, the procedure of how a mobile or a network node determines where another mobile's HLR is located is explained. Each network node maintains an identical Home Directory table (e.g., Table II) which is a hash table that maps a mobile's host name to its HLR. For example, the table may consist of three fields: mobile's ID (partial or complete), mobile's host name (partial or complete), and the SNLA of the mobile's HLR.

TABLE II

| Mobile ID | Mobile Hostname | HLR SNLA of Mobile |
|---|---|---|
| 000000–299999 | org1.mil–org9.mil | 31.0.0 |
| 300000–399999 | org10.mil–org19.mil | 40.0.0 |
| 400000–499999 | org20.mil–org29.mil | 1000.0.0 |

The table can have as few rows as the number of HLRs in the network. The network node performs the closest match on the host name or mobile ID. The table can be configured manually by a network administrator and changes infrequently.

An HLR may lose track of its mobiles for several reasons. Reasons for this may be, for example, the HLR entry for the mobile has expired because, for example, a mobile stopped sending location updates or the HLR is informed by other network nodes or other mobiles that the SNLA of its mobile is erroneous. In this case, the HLR is responsible for searching for the mobile. The most common approach is to page the mobile as in the cellular/PCS networks. There is much literature on paging in cellular/PCS networks, e.g., G. Wan et al., "A Dynamic Paging Scheme for Wireless Communication Systems," ACM/IEEE MOBICOM'97, pp. 195–203 (1997); and S. Tabbane, "Evaluation of an Alternative Strategy for Future High Density Wireless Communications Systems," Wireless Information Network Laboratory (January 1993). Many paging algorithms attempt to locate the mobile with minimal delay or minimal cost by trading off location updates and paging. The cost may include the number of paging messages, bandwidth, database transactions, etc. There is a direct tradeoff between frequency of location updates and paging cost. If an HLR receives an update every time a mobile moves, then there is no need to page. If a mobile does not update its HLR at all when it moves, then paging may be needed whenever the mobile is accessed. In sophisticated paging systems, an HLR often keeps a mobility profile of each mobile it tracks. The profile includes the mobility pattern of a mobile, such as the probability of being at a certain location at a certain time. Thus there is no need to send a location update to its HLR, if a mobile moves in a manner predictable by its HLR. In addition, a network node may cache (cache 18 in FIG. 2) the SNLAs of mobiles by monitoring packets generated by those mobiles which pass through the node in the last time interval. The interval is made short enough to ensure a small cache table. Also, it is optional whether or not to cache the port ID portion of the address. The paging messages sent by the HLR are examined by each receiving router. If the router has the mobile in its cache and the SNLA is different from the erroneous SNLA in HLR, it will send a reply message to the HLR with the mobile's SNLA and stop forwarding the paging message. The HLR may receive multiple SNLAs for the mobile. The HLR may decide to page the few areas indicated by the SNLAs and thus narrow the search scope.

Each network node also maintains a VLR that records information on mobiles that are within its coverage area and have registered with it. When mobiles move from one network node to another, the new network node adds the mobile to its VLR and informs the previous network node to delete the mobile in the old VLR. It is to be appreciated that the HLR, the VLR, and the Home Directory table may be stored and updated in memory 12 (FIG. 2) of the network node 104.

B. Mobile Access

Mobile access addresses how a mobile station initiates communications with a host, e.g., another mobile station. To support multimedia applications over the packet-switched wireless system 100, mobile access needs to be as flexible as possible so that different applications can use the access method best suited for them. The present invention provides two mobile access methodologies. One method allows mobiles to go through a complete access procedure by looking up the SNLA of a correspondent mobile in order to setup a connection. The other method allows mobiles to directly send traffic without knowing the exact location of a correspondent mobile. The two methods are respectively referred to as: (i) complete mobile access; and (ii) direct mobile access.

(i) Complete Mobile Access. For complete mobile access, a mobile determines the SNLA of the correspondent mobile through a set of signaling exchanges before it initiates communication with the correspondent mobile. Complete mobile access requires longer connection/call setup time and incurs more signaling overhead than direct mobile access. On the other hand, it enables traffic to flow directly to the correspondent host. Therefore, this method may preferably be employed for real-time traffic and data traffic with long connection time.

It is to be appreciated that the port ID of the SNLA need not be looked up. The port ID of a mobile's SNLA is dynamically assigned for each application flow by the mobile. The initiating mobile may first use a default value for the port ID until the corresponding mobile assigns a port ID for the flow. Upon receiving the port ID from the corresponding host, the initiating mobile then replaces the default port ID with the assigned port ID in the destination SNLA field of the outgoing packets. Locally, the initiating mobile may assign a port ID for the application flow and use the port ID in the source SNLA field of the outgoing packets.

Figure 5A:
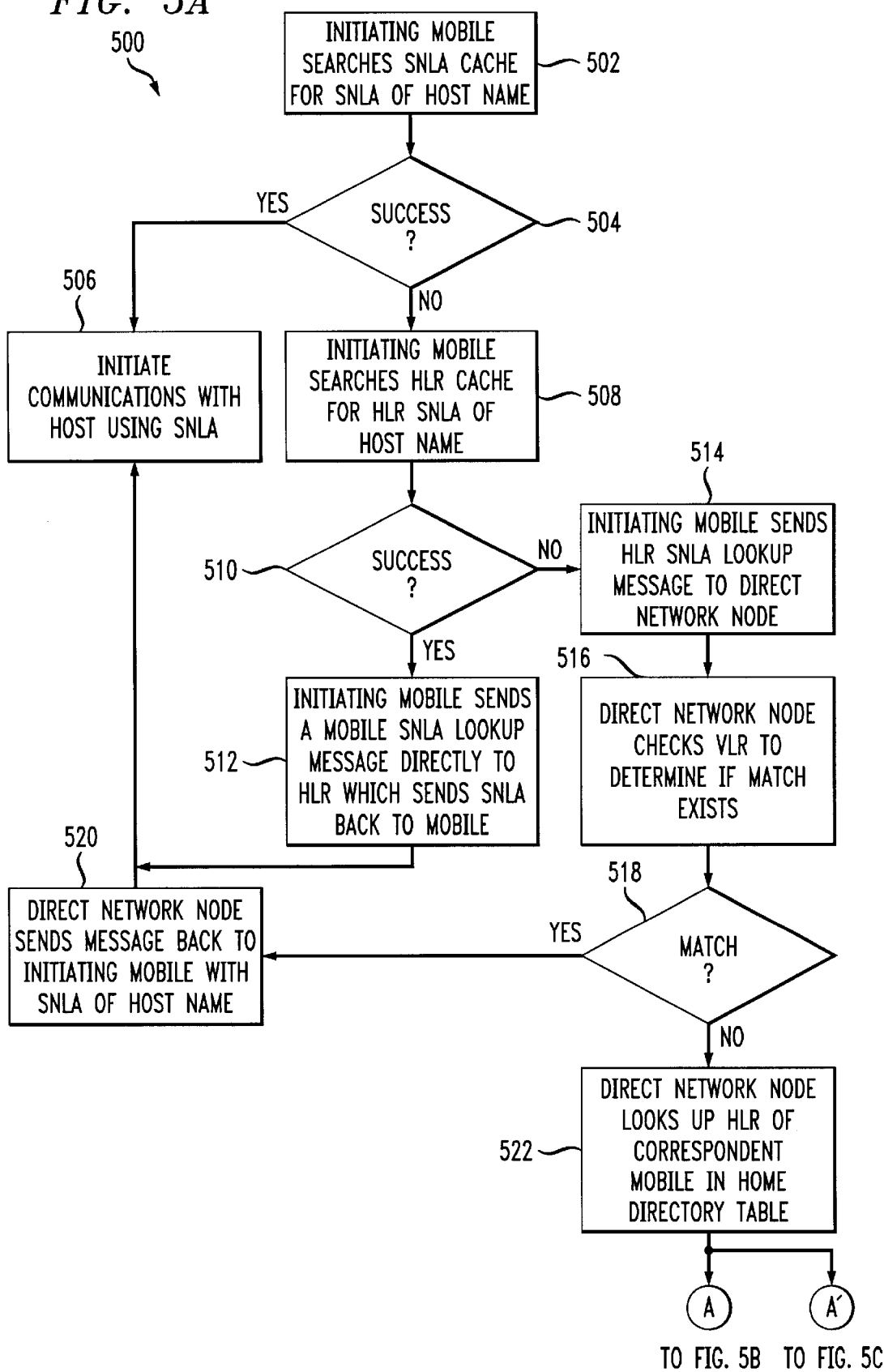

Referring now to FIGS. 5A through 5B, a flow chart of an embodiment of a complete mobile access method 500 is shown. A mobile starts with the host name of the mobile it intends to contact. The following steps illustrate a straightforward method on how to look up the SNLA of a correspondent mobile. The initiating mobile first searches its SNLA cache for the SNLA of the host name (step 502). A mobile preferably maintains a cache (cache 18 of FIG. 2) of some frequently used SNLAs which expire after sometime. If successful (step 504), no mobile access procedure is needed and the initiating mobile initiates communications with the host using the SNLA as the destination address (step 506). If not successful in step 504, the mobile searches an HLR cache (also in cache 18) for the HLR SNLA of the host name (step 508). A separate cache that lists the frequently used HLR SNLAs is also useful. If successful (step 510), the mobile sends a mobile SNLA lookup message directly to the HLR, which then sends the SNLA of the correspondent mobile back to the initiating mobile (step 512). The initiating mobile then initiates communication with the correspondent mobile in step 506. If not successful in step 510, the initiating mobile sends an HLR SNLA lookup message to the direct network node to query the HLR location of the correspondent mobile (step 514). The message includes the host name whose SNLA needs to be discovered.

The direct network node first checks its VLR to see if there is a match to the host name (step 516). If a match is found (step 518), the direct network node sends a message back to the initiating mobile with the SNLA of the host name (step 520). If no match is found in step 518, the direct network node looks up the HLR of the correspondent mobile from the home directory table (step 522), which maps a mobile to its HLR. The direct network node then sends a message back to the initiating mobile with the SNLA of the HLR (step 524). Upon receiving the message back from the direct network node, the initiating mobile sends a mobile SNLA lookup message to the HLR to query the SNLA of the correspondent mobile (step 526).

In step 528, the HLR searches its table based on the host name of the correspondent mobile. If the lookup is successful (step 530), the HLR sends a message back to the initiating mobile with the SNLA of the correspondent mobile (step 532). If the lookup is not successful, e.g., the HLR's SNLA entry for the host name has expired, the HLR initiates a search procedure for the correspondent mobile, for example, as described above in the Mobile Access section of the detailed description (step 534). Once the correspondent mobile is found, the HLR sends the SNLA of the correspondent mobile to the initiating mobile in step 532. Now, the initiating mobile can send packets directly to the correspondent mobile using the SNLA as the destination address. If the SNLA of the correspondent mobile is correct (step 536), the mobile access part is completed and the initiating mobile initiates communications with the correspondent mobile (step 538). If the SNLA given by the HLR turned out to be erroneous (step 536), the initiating mobile informs the HLR of the error (step 540), which may result in a mobile search by the HLR (step 542). The initiating mobile may try again at a later time.

One of ordinary skill in the art will realize that there are several variants to the complete access method described above. For instance, instead of the direct network node sending the SNLA of the HLR back to the initiating mobile (in step 524 of FIG. 5B), the direct network node may send a mobile SNLA lookup message to the HLR on behalf of the mobile. In the other direction, the direct network node forwards the SNLA of the correspondent mobile back to the initiating mobile. This alternative embodiment reduces the number of signaling messages needed for mobile access. Such alternative embodiment is illustrated in FIG. 5C. That is, after step 522 in FIG. 5A, the direct network node sends a mobile SNLA lookup message to the HLR on behalf of the initiating mobile (step 544). The HLR searches its table for the SNLA based on the host name of the correspondent mobile (step 546). If the SNLA is found (step 548), the HLR sends the SNLA back to the direct network node (step 550). If the SNLA is not found in step 548, the HLR initiates a search procedure for the correspondent mobile, for example, as described above in the Mobile Access section of the detailed description (step 552). Once the correspondent mobile is found, the direct network node sends the SNLA of the correspondent mobile to the initiating mobile (step 554). Now, the initiating mobile can send packets directly to the correspondent mobile using the latter's SNLA as the destination address. If the SNLA of the correspondent mobile is correct (step 556), then the mobile access part is completed and the initiating mobile initiates communications with the correspondent mobile (step 558). If the SNLA given by the direct network node turned out to be erroneous (step 556), the initiating mobile informs direct network node which then informs the HLR of the error (step 560). The HLR then begins a mobile search (step 562). The initiating mobile may try again at a later time.

Figure 6A:
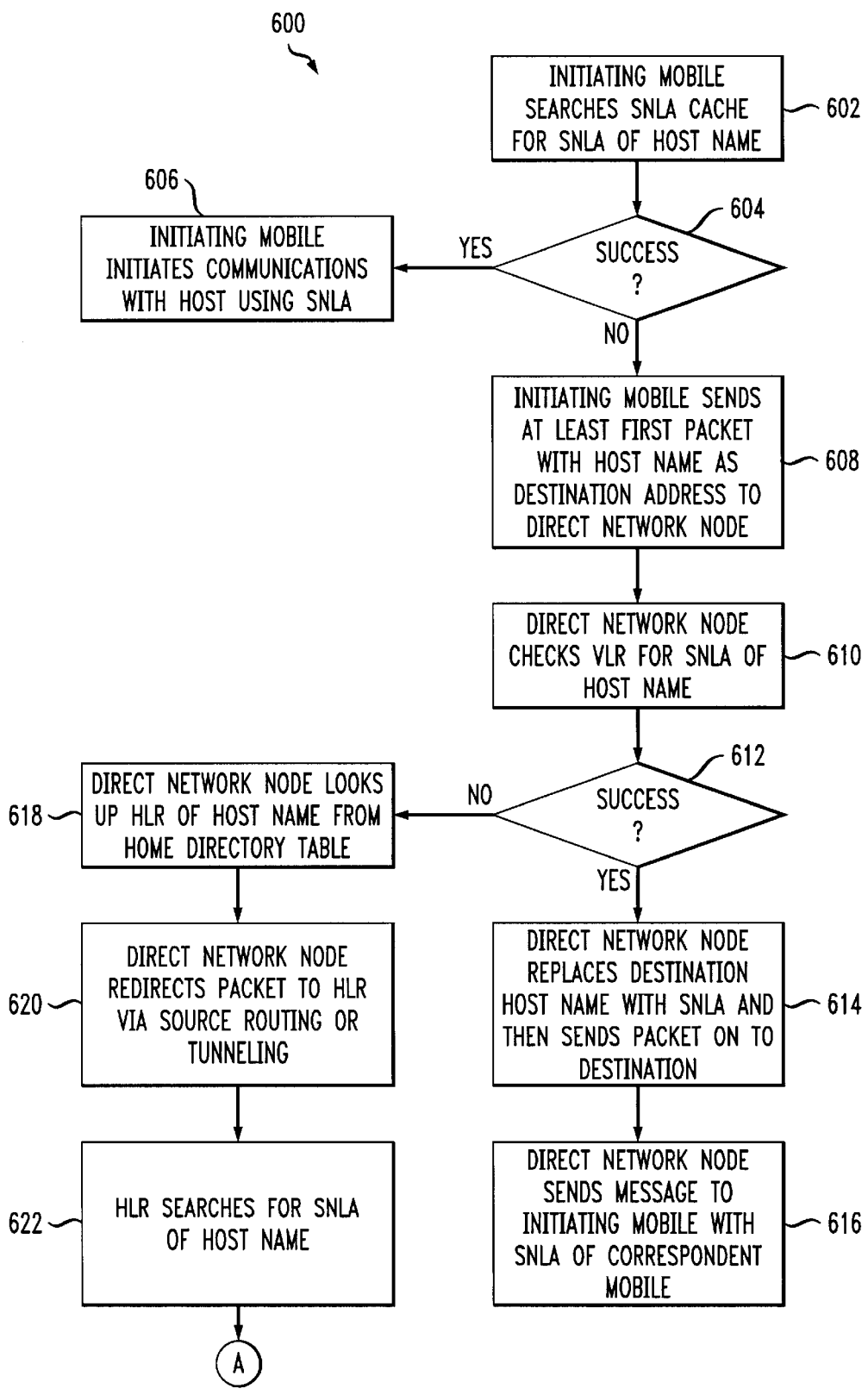

(ii) Direct Mobile Access. Referring now to FIGS. 6A and 6B, a flow chart of an embodiment of a direct mobile access method 600 is shown. In the direct mobile access method, after unsuccessfully attempting to obtain the SNLA of the correspondent mobile as a first step, the initiating mobile sends out packets directly to the correspondent mobile using the mobile's host name (not SNLA) as the destination. The HLR of the correspondent mobile and other network nodes are responsible for routing to the destination the packets which use host name in place of address. The initiating mobile is informed of the SNLA of the correspondent mobile either by the HLR or by a network node, whichever locates the mobile. Alternatively, the correspondent mobile may inform the initiating mobile of its SNLA via a packet received therefrom. That is, if the initiating mobile receives a packet from a mobile it intends to contact, the initiating mobile can pull out the correspondent mobile's SNLA from the source address in the received packet.

The host name address is then replaced by the SNLA in the subsequent packets sent by the initiating mobile. This access method enables fast mobile access and significantly reduces signaling overhead. However, bearer packets may risk being lost due to incorrect SNLAs. In addition, packets with a host name as destination may take an indirect route to the destination for a short period of time. This method may preferably be employed for connectionless bearer traffic and short bursty connections/calls. Also, the direct mobile access method can be used to send the first signaling message from the initiating mobile for initiating long duration calls. Once, the initiating mobile receives a response packet from the correspondent mobile, the initiating mobile can use the SNLA extracted from the correspondent mobile's response to direct subsequent packets. In the high mobility environment of the system 100, this method provides a flexible and lightweight approach to mobile access.

To support using host name as destination, a new address type is defined in the Subnetwork layer. A source or destination address is in the form of either an SNLA or a host name. Using host name as a source address allows a mobile to include a host name in its packets so that the destination does not need to perform a host name lookup on the source using the source's SNLA. Hostname lookup is required in many TCP/IP applications (the reverse lookup of host name from the IP address at the destination). Table III and IV show the format for both the SNLA and host name types of addresses.

TABLE III

| Type of address | SNLA |
|---|---|

TABLE IV

| Type of address | Type of host name | Length of host name | Host name |
|---|---|---|---|

The "type of address" field indicates whether the address following the field is an SNLA or a host name. For example, this field may be one bit and if set to a logic 1, this indicates that address is an SNLA, if set to logic 0, this indicates the address is a host name. If the address is an SNLA, then the following "length of host name" field is a fixed-length SNLA. If the address is a host name, then the "length of host name" field indicates the length of the host name in bytes. It is to be appreciated that, when employing a host name, various types of host names may be used. Thus, a "type of host name" field is preferably included. Therefore, the host name may be, for example, an IP host name or a generic host name. Lastly, a field containing the host name itself is included. Also, it is to be appreciated that the port ID portion of the SNLA is handled in the same manner as described above with respect to the complete mobile access method.

The following steps describe how direct mobile access according to the invention is preferably accomplished.

First, the initiating mobile searches its SNLA cache for the SNLA of the host name (step 602). If the SNLA is found (step 604), the initiating mobile goes ahead with initiating communications with the intended recipient mobile using the retrieved SNLA (step 606). If there is a cache miss (step 604), i.e., the mobile does not find the SNLA of the intended recipient mobile, the initiating mobile sends at least the first packet with the correspondent mobile's host name as the destination address to the direct network node (step 608). The mobile may choose to send the subsequent packets using the host name. However, as will be explained, the initiating mobile can wait to be informed of the SNLA before sending the next packet if, for example, the information therein is sensitive to packet loss.

Upon receiving the packet, the direct network node recognizes that the destination address is a host name. It passes the packet up to its mobility management module (part of he Subnetwork layer of FIG. 3) in the protocol stack. The mobility management module checks its VLR to see if it has the SNLA of the host name (step 610). If yes (step 612), the direct network node replaces the destination host name with the destination SNLA and then passes the packet down to its routing module (also part of the Subnetwork layer of FIG. 3) to be routed to the destination (step 614). In addition, the network node sends a message to the initiating mobile with the SNLA of the correspondent mobile (step 616). If the direct network node does not know the SNLA of the host name (step 612), it looks up the HLR associated with the host name from the home directory table (step 618) and then redirects the packet to the HLR using one of two methods (step 620). The direct network node may insert the SNLA of the HLR as an intermediate destination in front of the destination host name and use loose source routing as in IP to route the packet to the HLR. Or the immediate network node may tunnel the packet to the HLR, as is known in the art.

First, the HLR has to de-capsulate the packet if tunneling is used. Then, it finds the SNLA of the host name from its HLR database (step 622), and replaces the host name with the SNLA (step 624). It also informs the initiating mobile of the host name's SNLA (step 624). From the HLR, the packet is routed to the network node where the correspondent mobile resides (step 626). The network node then forwards the packet to the correspondent mobile (step 628). If the packet is undeliverable (step 630), the packet is dropped and an error message is sent back to the initiating mobile (step 632). After receiving the SNLA, e.g., from the direct network node, the HLR, or the correspondent mobile, the mobile switches to using destination SNLA immediately for subsequent packets (step 634). If a mobile receives an error message indicating the packet is undeliverable, it needs to inform the network node or the HLR whichever issued the SNLA. The mobile may try again later.

Figure 7:
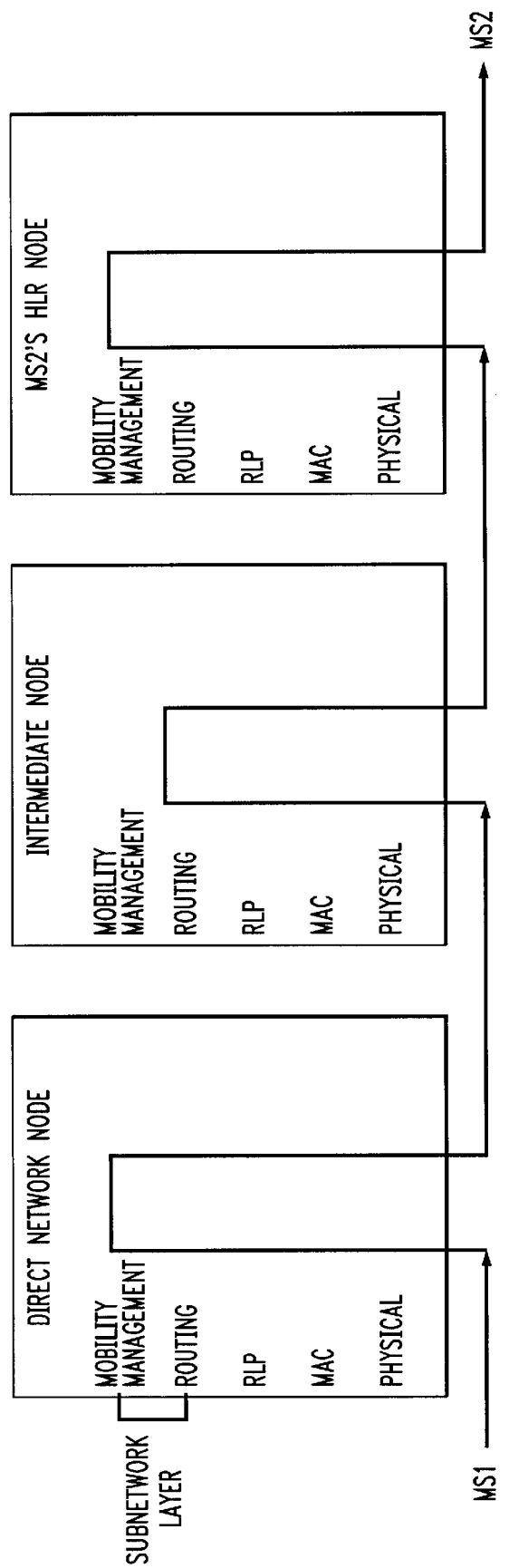
FIG. 7 is a block diagram illustrating a packet traveling path using the mobile access method illustrated in FIGS. 6A and 6B.

Referring to FIG. 7, a block diagram illustrates a traveling path of a packet using the direct mobile access method, where MS1 is the initiating mobile and MS2 the correspondent mobile. When the routing module of the direct network node receives the packet with a host name as the destination, it passes the packet to the mobility management module where the VLR and the Home Directory reside. After the SNLA of MS2's HLR is looked up from the home directory table, the packet is passed down to the routing module and is routed to MS2's HLR either through source routing or tunneling. The packet goes through some intermediate nodes where it only goes up to the routing module. At the HLR node, the packet is again passed onto the mobility management module where the HLR table resides. After the SNLA look up, the packet is routed to MS2.

Note that the above method involves little signaling overhead. Only one message is needed to inform the initiating mobile of the SNLA under normal circumstances. The route inefficiency could last as short as a round-trip time from the initiating mobile to the direct network node and as long as the worst of the two round-trip times, which could be between the two mobiles, or between the initiating mobile and the HLR. In addition, packets sent out with a host name as destination are subject to loss.

C. In-call Mobility Management

In-call mobility management addresses the issues of how to ensure the continuity of a connection/call when a mobile hands off from one network node to another. In addition, routes should be optimized during or after a handoff. Sometimes, it is desirable to be able to shield a correspondent node of a mobile's mobility. For example, the correspondent node may not be aware of or can not handle mobility. The in-call mobility management methodologies of the invention address these and other issues.

It is to be appreciated that one of the advantages of the addressing scheme of the invention, described above, is that the SNLA itself indicates the relative location of a mobile. Therefore, if a mobile moves (i.e., attaches itself to a new network node) during a call, it automatically changes the source address to the new SNLA in its packets. Since the correspondent mobile can recognize the mobile from the mobile ID portion of the SNLA, it knows that the mobile has changed its location. Therefore, the correspondent mobile stamps the destination field of its packets with the new SNLA. Without extra signaling messages, mobile locations are updated during a call. Since the system 100 is a packet-switched network and each packet is routed directly to the destination, the route is optimized automatically as well. This feature reduces the amount of signaling traffic significantly since a majority of the traffic, such as TCP/IP connections and voice calls, are two-way traffic.

Handoff management is the centerpiece of in-call mobility management. Each network node is equipped with a handoff manager module that is responsible for collecting relevant information from neighboring nodes. Mobiles communicating with the network node also assist in handoff decisions by providing signal strength information from neighboring nodes. Based on the information at its disposal, the handoff manager makes the decisions as to when and to which node a mobile should handoff. In the network architecture of the invention, it is assumed that when a mobile hands off to a different network node, its SNLA changes (assuming it is a hard handoff). Since the routing within the internode network 108 is connectionless, there is no need to reset the end-to-end path between the mobile and the correspondent host. However, the correspondent host needs to be informed of the new SNLA of the mobile. As discussed above, the source address portion of the Subnetwork layer header keeps the correspondent host informed of the change of the mobile's address without additional signaling messages.

If handoffs are frequent during a call/connection, there is a need to frequently update correspondent nodes on the changes in the mobile's SNLA. We can substantially reduce the frequency of these updates through the use of "anchors." Anchors, as is known, are used in cellular networks to reduce the need to reset the land-line portion of a circuit when a mobile hands off to a base station that is attached to a different switch (MSC). When such a handoff takes place, only a new inter-MSC circuit (and, of course, a base station-to-MSC connection) needs to be set up, leaving a major portion of the end-to-end circuit intact. In the present invention, the anchor for a mobile could be a node it was directly communicating with at some point in time, usually at the beginning of a call, although not necessarily so. When a call/connection is set up, the remote host is provided with the SNLA of the mobile's anchor (e.g., from the source address). Later, even when the mobile undergoes handoffs, the remote host is not necessarily informed of the actual address of the mobile so that it continues to send data packets to the anchor node which is responsible for forwarding them to the actual node in direct communication with the mobile. Of course, for this scenario to be possible, the anchor needs to be aware of the actual SNLA(s) of the mobile.

There are many advantages to employing an anchor according to the invention for a mobile during a call. First, the anchor of a mobile can shield the correspondent mobile from the mobile's mobility and thus possibly reduces the amount of end-to-end signaling exchanges. Second, an anchor simplifies handoffs and provides better call continuity by acting as an end point of the data link between the mobile and the network. In soft handoffs, an anchor may also perform packet/frame selection for packets flowing out of the mobile to the network and packet/frame duplication for packets flowing into the mobile. With soft handoffs, a mobile can be in direct communication with multiple nodes simultaneously. In one direction, packets transmitted by the mobile are received by all of these direct network nodes independently. The direct network nodes forward their received packets to the anchor node, which selects the best of the received packets according to some quality metric and then forwards them to the remote node. In the other direction, for each packet received, the anchor node makes multiple copies for distribution to the direct network nodes, which then send the copies off to the mobile where packets are selected or combined. If a radio link protocol (RLP) is to be used below the Subnetwork layer to overcome the high error rate of the wireless access segment, the anchor node with its frame selector/duplicator function could be used for termination of the RLP. It is to be appreciated that tunneling can be used to transport RLP frames between the anchor and the direct network nodes involved in soft handoff.

However, not all applications need an anchor. For example, an anchor may be too cumbersome for short connectionless traffic. While it is natural to have an anchor on a per mobile basis, the present invention generalizes this concept to allow anchors on a per call or per connection basis. This is consistent with the capability of the mobiles to engage in several simultaneous connections, some of which may benefit from anchors while others may not.

If soft handoffs are not to be used, the node in direct communication with the mobile is the best place to terminate RLP from the viewpoint of implementation simplicity. In this case, the direct network node is responsible for assembling Subnetwork layer packets from RLP frames in the uplink direction. The assembled Subnetwork layer packets are sent directly to the remote node or routed via the anchor for consistency. Whenever the mobile is handed off to a new direct network node, it reestablishes the RLP with the latter. In this case, if some higher layer packets in transit at the time of the handoff are lost, they can be recovered through higher-level recovery procedures. If an anchor node changes relatively less frequently, terminating the RLP at the anchor has several advantages. In this scenario, the RLP remains intact during the handoff procedure so that any RLP frames that may be lost during the handoff are recovered via RLP level recovery procedures which are faster and more efficient than higher level procedures.

Although the concept of an anchor is introduced to hide the changes in a mobile's actual location from remote hosts, there are times when the anchor of a mobile needs to be changed. For instance, if the mobile has moved far from its anchor, routing traffic via the distant anchor results in a highly inefficient use of network resources. Consequently, the anchor needs to be moved to a node that is located close to the mobile's current location. Of course, when the anchor is changed, the remote hosts have to be informed of this change. Since the Subnetwork layer header of packets originating from the mobile includes the identifier of the new anchor, the remote node can be made aware of the change of anchor without the need for additional signaling. When an anchor change takes place, the old anchor may continue to receive packets from the remote hosts (which are now expected to reach the mobile via the new anchor). In that case, the old anchor for some time continues to forward them to the mobile via the direct network node(s).

Figure 8A:
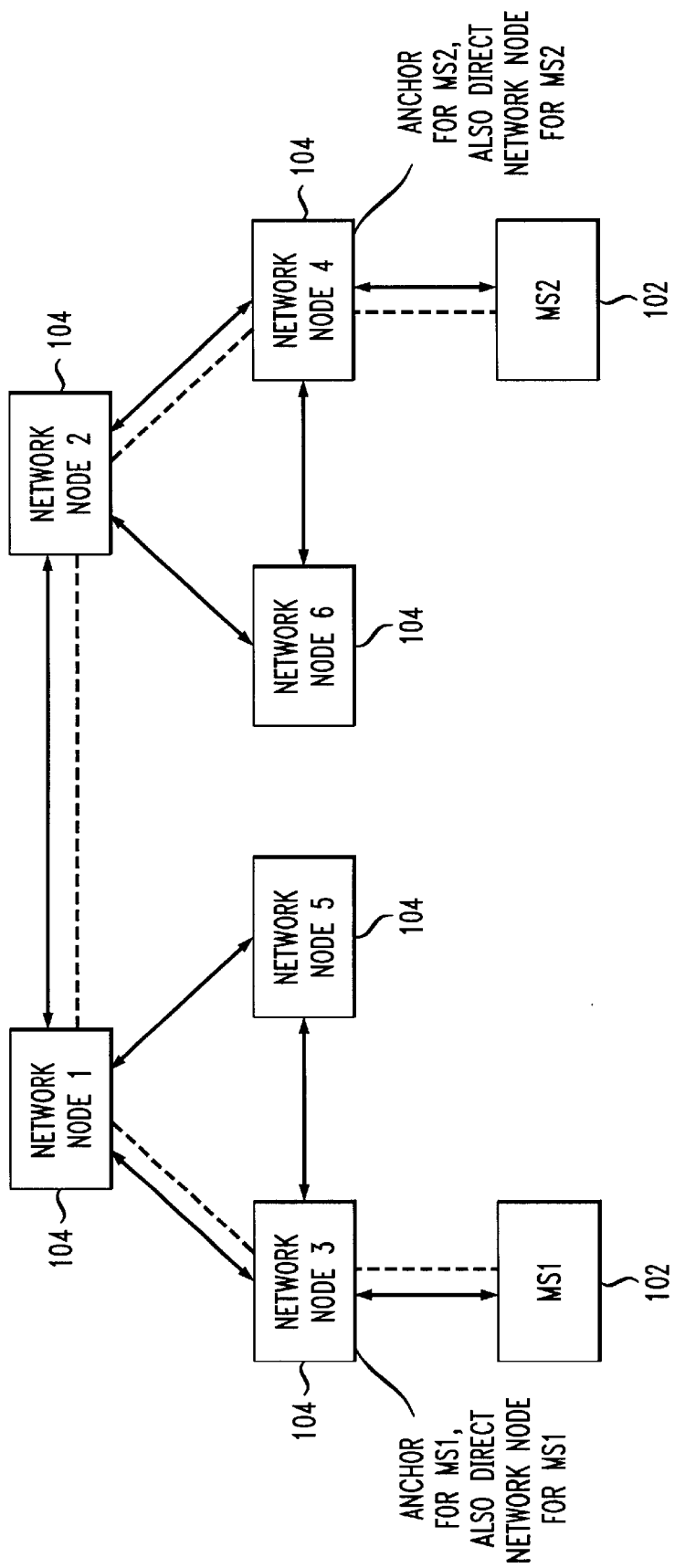
FIGS. 8A and 8B are block diagrams of a portion of a mobile communications system illustrating in-call mobility management according to an embodiment of the present invention.
Figure 8B:
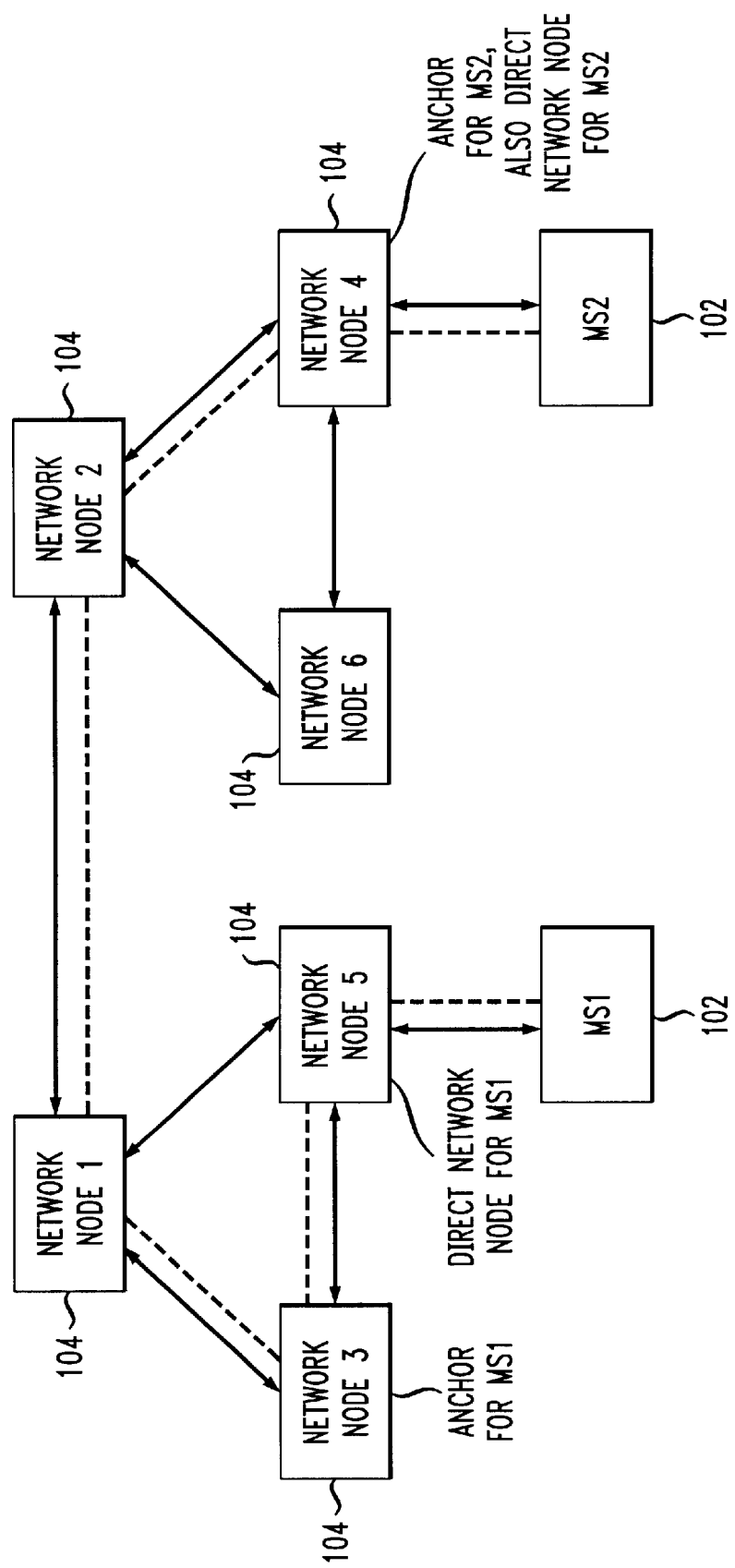

Referring now to FIGS. 8A and 8B, an example of the use of anchors in the multimedia mobile network, according to an embodiment of the invention, is shown. FIG. 8A shows the network configuration at the beginning of a call between mobile stations MS1 and MS2, which are in direct communication with network nodes NN3 and NN4, respectively. It is to be appreciated that, in addition to serving as respective direct network nodes to MS1 and MS2, NN3 and NN4 also serve as anchors for MS1 and MS2, respectively. Thus, when a call between MS1 and MS2 is established, the SNLA of MS1, passed to MS2, is NN3.MS1 and the SNLA of MS2, passed to MS1, is NN4.MS2. Therefore, the data traffic destined for MS1 is sent by MS2 to NN3 which then passes it on to MS1. An exemplary path (denoted by dashed lines) is MS2 to NN4 to NN2 to NN1 to NN3 to MS1. Similarly, the data traffic destined for MS2 is sent by MS1 to NN4 which then forwards it to MS2. An exemplary path (denoted by dashed lines) is MS1 to NN3 to NN1 to NN2 to NN4 to MS2.

Referring now to FIG. 8B, the network configuration is shown of the case where MS1 undergoes a hard handoff such that MS1 is in direct communication with NN5. It is to be appreciated that hard handoff may be accomplished in any conventional manner whereby MS1, NN3 and NN5 are each informed of the handoff, e.g., signaling between mobile stations and network nodes, as is known in the art. After handoff, MS1's link with NN3 no longer exists. However, NN3 continues to serve as the anchor for MS1, which advantageously means that MS2 need not be informed of the new SNLA of MS1 (which is now NN5.MS1). Therefore, MS2 continues to send the data traffic meant for MS1 to the network node NN3, which then forwards it to MS1 via its current direct network node NN5. The dashed line in FIG. 8B shows the new exemplary data path for the traffic flowing from MS2 to MS1.

V. IPv4 Implementation of Subnetwork Layer Addressing

As previously mentioned, the present invention provides a mobile network which implements the IPv4 standard in accordance with the Subnetwork architecture and addressing principles described above. Thus, it is to be appreciated that the network component arrangement (section I) and network architecture (section II) described above may be employed in the IPv4 mobile network of the invention. It is to be appreciated that the Subnetwork Layer Addressing techniques (section III) described above with respect to SNLAs are inventively adapted, as explained below, to be implemented using the IPv4 standard.

A. IPv4 Subnetwork Layer Addressing

In accordance with IPv4 Subnetwork layer addressing, every mobile host has a permanent IP address (hereinafter referred to as a PIPA) assigned by the system administrator, as it is in IP networks. In addition, a mobile 102 (FIG. 1) also has a unique mobile identifier or mobile ID (MID) assigned thereto. The MID is unique among all the mobiles within the network 100 (FIG. 1). To communicate, the mobile also has a Location IP Address (hereinafter referred to as a LIPA) assigned thereto, which indicates a mobile's location. A mobile's LIPA changes as the mobile moves from one point of attachment to another. The PIPA address does not change as a mobile host moves. Each network node 104 (FIG. 1) within the network has a router identifier or router ID (hereinafter referred to as a RID) and the RID is unique among all routers in the network. It is to be appreciated that each network node is preferably capable of providing router functions, base station type functions, and mobility management functions. As such, use of the term "router" is intended to refer to the portion of a network node that provides the routing functions. Each network node must also have a LIPA (RID. 0).

A LIPA format employed according to a preferred embodiment of the invention is 32 bits in length. The 32-bit LIPA is divided into two parts: the router ID (RID) and mobile ID (MID). The first 12 bits of a LIPA are the router ID. The remaining 20 bits of the LIPA are the mobile ID. This partitioning of the address space supports a network of roughly 4000 routers and 1 million mobile hosts. Of course, it is to be appreciated that alternative partitions are possible.

A mobile's LIPA has the format of RID.MID. The RID of a mobile's LIPA is the ID of the router to which the mobile is currently connected. The MID in a mobile's LIPA is the mobile's unique ID. If a mobile host becomes attached to another router, the RID part of its LIPA also changes to the ID of the new router. The LIPAs of the routers are RID.0. They do not change as routers move.

Special IDs and addresses can be reserved for broadcasting and multi-casting purposes. A RID with a value of 0xfff represents all routers. Thus a LIPA address of 0xfff.0represents a broadcast address to all routers. Similarly, a MID with a value of 0xfffff represents all mobiles. A LIPA address of RID.0xfffff represents a broadcast address to all mobiles under the router with the RID. A LIPA address of 0xfff.0xfffff represents a broadcast address of all the mobiles in the network 100.

Multi cast addresses may also be reserved. RID values ranging from 1 to 128 and MID values ranging from 1 to 128 are preferably reserved for multicast addresses. Thus, there are 16,386 multicast addresses that may be used in the network.

With respect to a packet that is transferred in the Subnetwork layer, the IP header of the packet contains a source IP address field, a destination IP address field, and a protocol address field. When a mobile host sends a Subnetwork Layer IP packet, it includes its LIPA in the source IP address field. The mobile host includes the LIPA of the corresponding host in the destination IP address field, as currently known to the mobile source. A destination address with a value equal to 0 means the LIPA of the corresponding host is unknown.

The 8-bit protocol field is set to 4 if IP-in-IP is used. Otherwise, the protocol field can be set to whatever protocol is encapsulated by the IP header (e.g., 6 for TCP or 17 for UDP). If the protocol field indicates a transport layer, then only one layer of IP is used.

B. Address Option

Figure 9A:
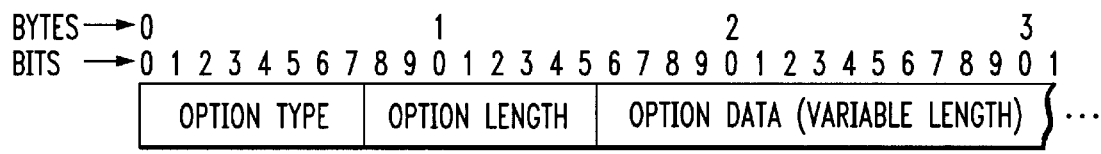
FIGS. 9A and 9B are diagrams illustrating exemplary formats of an address option feature according to the present invention.

It is to be appreciated that the IPv4 standard generally defines an option field which includes option type, option length and option data fields. A format for these fields, included in the header portion of an IP packet, is illustrated in FIG. 9A. The IPv4 standard defines usages for the option field such as trace routing, source routing and debugging. The maximum length of the option field in an IP header is preferably 40 bytes, limited by the IP header length field. The option type field may include 8 bits of the IP packet header portion (i.e., bits 0–7). The option type specifies what type of option is being exercised, e.g., bits: 01234567 may have a value of: 10010001, which represents some desired option. The option length field specifies the length of the option in bytes, including the option type and the option length fields. The option data field includes the data associated with the specified option. The option data field may be variable in length but preferably no more than 38 bytes.

In accordance with the present invention, a new type of option called the "address option" is advantageously defined to facilitate transfer of packets, e.g., with respect to mobility management, in the network 100. The address option field allows an IP packet to carry additional addressing information. By way of one example, such information may include the destination's PIPA to help the mobility management module 28 (FIG. 3B) in locating the destination host. The address option can be combined with existing options (e.g., as mentioned above, as well as others) in the same IP header. The address option according to the invention is preferably implemented in the option data field shown in FIG. 9A. An example of this novel address option field format is illustrated in FIG. 9B.

Figure 9B:
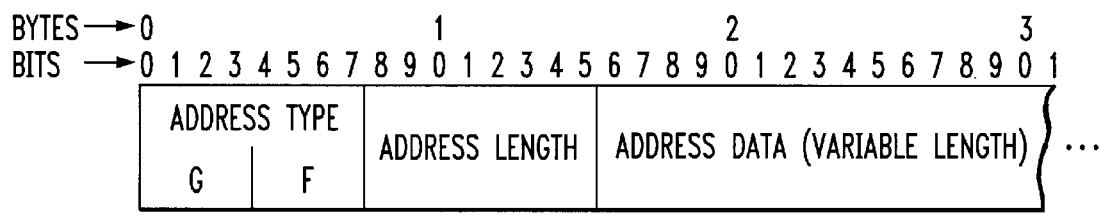

In the example of FIG. 9B, the address option field is used to carry additional mobile address information. Thus, the fields within the address option field are an address type field, an address length field, and an address data field. Within the 8-bit address type field, three 'G' bits (bits 0–2) and five 'F' bits (bits 3–7) are specified as follows:

'G' bits (bits 0–2):
  000 (value 0): Default;
  001 (value 1): the address data field contains the source address of the packet;
  010 (value 2): the address data field contains the final destination of the packet.

'F' bits (bits 3–7):
  00000 (value 0): Current LIPA;
  00001 (value 1): Permanent IP address;
  00010 (value 2): MID;
  00011 (value 3): RID;
  00100 (value 4): the content of the address data field contains the PIPA; the target is the HLR of the mobile with that particular PIPA;
  00101 (value 5): the content of the address data field contains the mobile ID; the target is the HLR of the mobile with that particular mobile ID;
  0011 (value 6): the content of the address data field contains the PIPA; the target is the last LIPA of the mobile identified by that particular PIPA;
  00111 (value 7): the content of the address data field contains the mobile ID; the target is the last LIPA of the mobile identified by the mobile ID;
  01000 (value 8): the content of the address data field contains the PIPA; the target is the next LIPA of the mobile identified by the PIPA;
  01001 (value 9): the content of the address data field contains the mobile ID; the target is the next LIPA of the mobile identified by the mobile ID;
  01111 (value 15): IP address of a multicast group.

The remainder of the possible 'F' bit values are unspecified and thus available for further information.

The address length field specifies the length of the address in bytes including the address type and address length fields. The address data field contains the address data of the type specified in the address type field. The address can be any of the types indicated by the address type. The address data field is variable in length. However, since the total option field is preferably not more than 40 bytes, the address data field preferably has a maximum length of 38 bytes.

It is to be appreciated that the Address Option feature of the invention is not limited to use with the IPv4 standard, but rather may be employed in other packet-based network architectures.

C. Processing a Subnetwork Layer IP Packet by a Network Node

Figure 10:
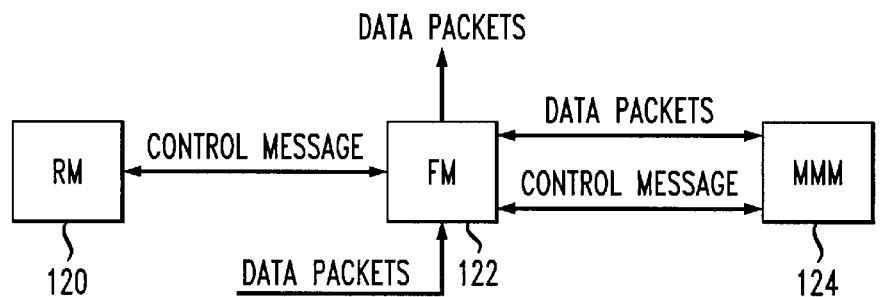
FIG. 10 is a block diagram illustrating processing of a subnetwork layer IP packet according to an illustrative embodiment of the present invention.

The following section describes an illustrative methodology, in the context of FIG. 10, for processing a Subnetwork layer IP packet within a network node 104. Recall that FIG. 3B illustrates the functional modules that may be employed within a mobile and a network node of the network 100. The following explanation refers to three modules: (i) a forwarding module (FM); (ii) a routing module (RM); and (iii) a mobility management module (MMM). It is to be appreciated that the MMM may correspond to the mobility management module 28 of FIG. 3B, while the RM and FM may correspond to the routing/forwarding module 30 of FIG. 3B. The relationship between the routing module (RM) 120, forwarding module (FM) 122 and the mobility management module (MMM) 124 are illustrated in FIG. 10.

RM 120 is responsible for creating and updating a routing table, but it does not use it. MMM 124 has the ability to modify the routing table as well. The MMM adds a special entry to the routing table that is being looked up by the forwarding module. The routing entry has a destination of value 0. The FM 122 either has a copy of the routing table or uses the same routing table in the RM. The RM and FM may be implemented using known routing and forwarding techniques. When a data packet arrives at the FM, the routing table is looked up in order to find where the packet should be routed. Normally, the Subnetwork layer packet is forwarded to other network nodes or mobiles by the FM in the network node like any other IP packets. The exceptions and how they should be processed are listed below.

When the RID of the destination LIPA in the outermost IP header matches the RID of the network node, one of several scenarios can occur:

1) The packet is destined for a mobile that is directly connected to the network node with the RID. The packet is forwarded to the mobile whether it is a data packet or a control packet.
2) The network node with the RID is the end point of a tunnel for the packet. This is treated as any other tunneling in IP. For example, the outer IP header is stripped off and the IP packet is forwarded on the basis of the inner IP destination.
3) The packet is a control message (e.g., a mobile management control message) that is destined for the network node. The message is forwarded to the MMM. The MMM then processes the message accordingly.
4) The packet is destined for a mobile whose HLR is the network node with the same RID. The packet is forwarded to the MMM. The MMM then looks up the LIPA of the destination PIPA, fills the destination LIPA with the LIPA that was looked up and forwards the packet back to the FM.

When the destination LIPA in the outermost IP header has a value of zero, one of two scenarios can occur:
1) The packet is destined for a mobile whose LIPA is not known to the sender. The packet is forwarded to the MMM. There, the destination PIPA is used to look up the LIPA. If the network node has the LIPA for the PIPA, then the destination of the outermost IP header is replaced with the LIPA. The MMM then sends the packet back to the FM. If the network node does not have the LIPA, then the HLR LIPA of the destination PIPA is used as the destination LIPA. The packet is then sent back to the FM. The FM then forwards the packet to the HLR of the destination.
2) The packet is a mobility management control message that is destined for a network node or a mobile. The message is processed in a manner described according to section (VI) below.

Generally, in order to prevent loops between the FM 122 and the MMM 124, a forwarding module should preferably not send back a packet that came directly from the MMM. If for any reason the forwarding module or the MMM can not process the packet, the packet is preferably discarded.

VI. IPv4 Implementation of Mobility Management
A. Components of Mobility Management Mobility management of the IPv4 implementation of network 100 employs three main components to function: (i) Home Directory (HD); (ii) Home Location Register (HLR); and (iii) Visitor Location Register (VLR). FIG. 4 illustrates each of these components with respect to a network node.

(i) Home Directory (HD). The function of a Home Directory is to map a mobile's PIPA to the LIPA of the mobile's HLR using a longest prefix match method. The longest prefix match method is well-known in the art of packet forwarding. Every router has an HD. The HD is a table with the following entries: (i) a mobile's PIPA or a set of PIPAs indicated by the common prefix; (ii) the LIPA of the mobile's HLR; (iii) the backup LIPA(s) of the mobiles' HLR (optional).

(ii) Home Location Register (HLR). An HLR keeps the location and other mobility-related information of its mobiles in its database. Each mobile is required to have at least one HLR that keeps track of its location. Although a mobile may cache its HLR's LIPA for convenience, the mobile is not required to know where its HLR is. When the mobile needs to contact its HLR, it can either use the Address Option field to contact the HLR directly, or it can first obtain its HLR's LIPA through location query and then contact the HLR directly. There may be multiple HLRs distributed in the network, each responsible for a subset of mobiles.

An HLR may have hot or cold standby units. A hot standby HLR is an HLR which is tightly synchronized with its associated primary HLR. That is, the hot standby HLR contains the most up-to-date information with respect to the primary and, in the case of a primary HLR failure, the network can switch to the hot standby HLR. A cold standby HLR does not have the most up-to-date information and, in the case of a primary failure, must first be updated before being switched to.

An HLR may be on a router or a standalone unit. The only requirement for the HLR is that the HLR's LIPA does not change with the mobility in the network and that the HLR can be reached via the LIPA. Each router has a home directory which maps a mobile to the LIPA of the mobile's HLR. Initially, the home directory can be configured manually or automatically. Manually refers to a network operator actually entering data, where automatically refers to an algorithm/software code handling this function. Normally, the home directory should preferably not change with the mobility of the network unless changes happen to the HLRs themselves. For instance, if an HLR breaks down, i.e., fails, each router updates its home directory. In the case where an HLR resides in a router, and the router breaks down, other routers will learn of the failure of the router and, thus, the failure of the HLR via routing updates. If the HLR resides on a standalone unit that is wired to a router, other methods for propagating the failure to the rest of the network may be employed.

An HLR entry contains the following fields with respect to each mobile: (i) mobile ID; (ii) mobile host's LIPAs (a mobile may have multiple LIPAs if it is in soft handoffs in a CDMA system); (iii) LIPA lifetime; (iv) mobile host's PIPA; (v) mobile host's hostname; (vi) mobile status.

The concept of a LIPA lifetime field will now be explained. For each LIPA, there is a lifetime (i.e., duration) field associated with it. The following is an example of values that may be represented in the lifetime field:
Value 0: Indicates the lifetime of the address is 0, thus the address is invalid.
Value 1: Indicates the lifetime of the address is unknown, thus the address may or may not be valid.
Value 2 to 5: Reserved.
Value 6 to 665534: Indicates the lifetime of the address in seconds. When the lifetime is reached, the mobile status in the HLR is then set to the location unknown value and the lifetime of a location unknown address is set to a value of infinity.
Value 665535: A value of 0xffff indicates infinity. For PIPA and MID types of addresses, the lifetime should be set to the value of 665535 which indicates that the lifetime of the addresses is infinite.

The mobile status field will now be explained. It is to be understood that various mobile status conditions may be specified in this field based on the value that the field represents. The following is an example of values that may be represented in the mobile status field:
Value 1: Unreachable. It means that the mobile can not be reached.
Value 2: Reachable. It means that the mobile can be reached.
Value 3: Sleeping. It means that the mobile has gone to a power save mode. To communicate with the mobile, the mobile may need to be woken up.
Value 4: Location unknown. It means that the mobile's location is unknown. The mobile's location can be searched and updated.

If the mobile status is reachable or sleeping, then the LIPA field should have a valid value. If the status indicates location unknown or unreachable, then the LIPA field should be set to 0 indicating the invalid LIPA. There is a subtle difference between the status of unreachable and location unknown. A mobile may decide to disconnect from the network in which case it sends a location update message indicating that it is not reachable for a certain period of time. When its HLR receives the location update message, it updates the mobile's status to be unreachable. If any Location Query Messages (LQMs), to be explained below, come for that mobile, HLR will not search for the location of the mobile, knowing that the mobile is currently unreachable. However, if the mobile has the status of location unknown, the HLR may need to page the mobile in order to locate the mobile when receiving an LQM.

An HLR updates its HLR table when it receives an Location Update Message (LUM), to be explained below. It usually copies the mobile status from the LUM to its HLR table. When an HLR receives an LUM with the lifetime field of the LIPA set to 0, it means that the LIPA of a mobile indicated by the LUM is not valid and the LIPA should be removed from the HLR entry of the mobile. If the LIPA happens to be the only LIPA for the mobile known to the HLR, the HLR then sets the mobile status to location unknown and the lifetime field is set to infinity. An HLR also updates its table when the lifetime of mobile status expires. The mobile status is changed to the default value of location unknown and the lifetime is set to infinity when lifetime expires. An HLR also preferably updates its table when it receives an ICMP(Internet Control Message Protocol) message indicating host unreachable. The HLR extracts the destination LIPA from the ICMP message and then the MID from the LIPA. The HLR removes the LIPA from the mobile's entry in the HLR table and updates the entry accordingly.

(iii) Visitor Location Register (VLR). Each router within the network 100 preferably has a Visitor Location Register (VLR) associated with it. A VLR mayor may not collocate with the router in association. A VLR contains the information on all the mobile hosts that are communicating directly with the router. It may contain mobile hosts that are currently not communicating directly with the router but require forwarding by the router. A VLR entry contains the following fields with respect to each mobile: (i) mobile ID; (ii) mobile's PIPA; (iii) mobile status; (iv) LIPA lifetime; (v) buffering; and (vi) forwarding LIPA(s).

It is to be understood that various mobile status conditions may be specified in the VLR mobile status field based on the value that the field represents. The following is an example of values that may be represented in the mobile status field:
Value 1: Reachable.
Value 2: Sleeping.
Value 3: Forwarding. This means that the mobile has moved to a new address, please forward the packets to the new address.

The LIPA lifetime field is as defined above with respect to the HLR. When the lifetime is reached in the VLR, the VLR can page the mobile in its coverage area. If there is an answer from the mobile, then the mobile's entry in the VLR is updated accordingly. If the mobile is paged a number of time, e.g., three times, and there is no answer from the mobile, then the mobile entry in the VLR is removed. In either case, the VLR informs the HLR of the mobile status. Before deleting the entry, the router sends an LUM to the mobile's the HLR indicating the mobile's LIPA associated with the router is not valid.

The buffering field indicates whether or not a mobile wants the router to buffer transient packets destined to the mobile. The buffering field can only be set when the mobile is in forwarding status and no forwarding LIPA(s) is known to the forwarding router yet. The duration of buffering before the forwarding LIPA arrives and the amount of data buffered are within the discretion of the router. Once the forwarding router receives the forwarding LIPA(s), the buffering bit should be unset.

If the forwarding LIPA(s) has not arrived yet and the mobile status indicates forwarding is required, the forwarding LIPA field is set to 0. If the buffering bit is set, the router immediately starts transmitting the buffered data, and then forwards the newly-arrived data to the mobile, as soon as the forwarding LIPA(s) arrives at the forwarding router for the mobile.

When a packet arrives at a router, if the RID portion of the destination IP address matches the RID of the router, the router then extracts the MID part of the destination address and looks up the MID in its VLR. If the mobile can not be found in the VLR, then the packet is dropped. An ICMP message is sent to the sender of the packet indicating host unreachable. If the mobile can be found in the VLR and the mobile status is active, the packet is delivered to the mobile right away either through a broadcast medium or a point-to-point link. If the mobile status is sleeping, the router may page the mobile in its coverage area and wake up the mobile before it delivers the packet. Once the mobile is awake, it sends a LUM to its VLR and HLR. If the status is forwarding and the forwarding LIPA is available, it then forwards the packet to the new location of the mobile. Alternatively, the mobile can re-register with its direct network node and the direct network node can send an LUM to the mobile's HLR on behalf of the mobile.

There are many types of errors that could happen when a packet arrives at a destination router:
1) The packet is undeliverable, even though the mobile status in the router's VLR indicates the mobile is active.
2) The mobile does not respond to paging by the destination router, even though the mobile status indicates sleeping.
3) An ICMP message comes back from the router to which the packet was forwarded by the destination router indicated by the prefix of the destination.

Under these error scenarios, the VLR has to be updated correspondingly. In the case of error type 1, the router may page the mobile. If the mobile responds to the paging, it would inform the router what status it is in. If the mobile does not respond, the router deletes the mobile's entry. In the case of error type 2, the router deletes the mobile's entry. For type 3 errors, if the ICMP message indicates host unreachable, then it may mean that the forwarding address may not be correct. In that case, the mobile's entry can be deleted from the VLR. The router is also responsible for informing the mobile's HLR of any mobile status changes. If the mobile's entry is to be deleted, the router should send an LUM with the LIPA(s) copied from the VLR and the lifetime of the address(es) set to 0 to indicate that the LIPA(s) of the mobile is invalid.

B. Mobility Management Control Messages (MMCMs)

In the IPv4 implementation of the network 100, five types of MMCMs are defined for mobility management: (i) Location Update Message (LUM); (ii) Location Confirm Message; (iii) Location Query Message (LQM); (iv) Location Reply Message (LRM); (v) Registration Message (RM); and (vi) Registration Reply Message (RRM).

In general, these messages are used in the following manner. When a mobile moves from router A to router B, it first needs to register with router B by sending router B an RM. Upon receiving an RRM back, the mobile may send an LUM to its HLR either directly or indirectly through router B. Alternatively, the mobile registers with router B, and router B informs router A and the mobile's HLR of that fact. Router B may aggregate multiple LUMs destined to the same HLR into one large LUM. In addition, the mobile may decide to send an LUM to router A right before it drops the link with router A or after it drops router A and connects with router B. In the LUM, as will be explained, the 'C' bit indicates if packet forwarding is desired from router A to router B. Furthermore, the mobile preferably informs the corresponding mobiles with which it maintains active communications either through an explicit LUM or through an implicit location update, as described below.

If a mobile or a router finds that there is an error with the LIPA of mobile H, it informs the HLR of mobile H of the error by sending an LUM. An example is if a router finds that it has an entry of the mobile in its VLR, but it can not reach mobile H in its coverage area. In such case, the router sends a location update message to the mobile's HLR before removing the entry for the mobile from its VLR. The HLR updates the mobile's status to be location unknown. When a mobile sends a packet but receives an ICMP message indicating host unreachable, it then sends an LUM to the HLR of the unreachable host as well as the source where the mobile acquires the LIPA. Should the HLR trust the mobile upon receiving this type of message, the HLR and source update their table.

When mobile H needs to locate mobile I whose location is indicated by mobile I's LIPA, mobile H sends an LQM. Included in the message is any combination of mobile I's address types defined by the 'F' bits in the Address Option. The IP destination address of LQM could be set to 0, a LIPA (e.g., HLR's LIPA) or a router's LIPA. The most commonly used destination IP address is the direct router's LIPA or 0. In either case, the router first checks its VLR to see if it has any information on the mobiles whose locations are queried. If yes, the router can send LRMs to the mobiles. If not, the router looks up the LIPAs of the HLRs for the mobiles. It sorts the queries by HLR and aggregates the queries with the same HLR and then sends an aggregate message to the HLR. In the reverse direction, the HLR may also sort multiple replies by RID and send a large LRM to each router with the destination IP address set to the router's RID. The router receiving the LRM is responsible for parsing the large LRM into separate LRMs destined to the individual mobiles within its coverage area. Or the router may multicast the aggregate LRMs to the mobiles if a broadcast medium exists between the router and its mobiles.

Figure 11A:
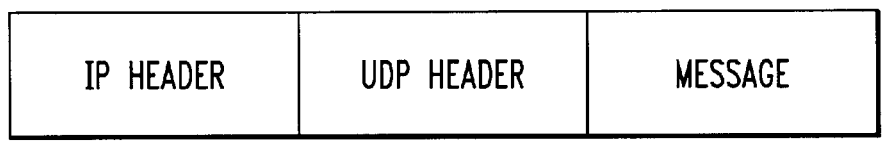
FIGS. 11A through 11P are diagrams illustrating exemplary formats of mobility management control messages according to the present invention.

Referring to FIG. 11A, an illustrative message format for all six types of MMCMs is shown. The message format preferably includes; (i) an IP header field; (ii) a UDP header field; and (iii) a message field. The individual MMCMs will now be described below.

(i) Location Update Message (LUM). A mobile may send a location update message (LUM) to its HLR, to a router or to another mobile to report its current location. A router, especially a direct router, may send a location update message on behalf of a mobile to the mobile's HLR. A router or an HLR may send an LUM to a mobile informing the mobile of another mobile's location. A router may aggregate multiple LUMs into one aggregate LUM and send it to the mobiles' HLR.

The location update message has the following format:(i) IP header with a source field, a destination field; (ii) UDP header with a source port field, a destination port field and a UDP checksum field; and (iii) Message with a type field, a location updates number field, a location update field, wherein the location update field, itself, includes the following fields: sequence number, A–H, update source, mobile status, number of addresses and addresses. Each field will now be explained.

In the IP header field, the source field includes the sender's LIPA, the destination field is set to 0, the location IP address of a mobile's HLR, a mobile or a router, and the Address Option is an IP option. If the destination field in the IP header is 0, then the Address Option indicates what the destination of the packet should be. For instance, the 'G' bits of Address Type in the option have a value of 2 indicating it is a destination address and the 'F' bits of Address Type have a value of 4 indicating the address is the HLR of a mobile identified by its PIPA. The Address Data field then has the mobile's PIPA. The direct router that receives such an LUM sees that the IP destination is set to 0, and thus passes the message to its mobility management module. The MMM then extracts the PIPA, looks up the HLR of the mobile, replaces the IP destination address with the HLR's LIPA and sends the message back to the forwarding module of the router to be routed to the HLR.

In the UDP header, the source port field is variable and the destination port field may be set to the value of 1000. The UDP checksum field includes a checksum of the UDP data as well as the UDP header.

Figure 11B:
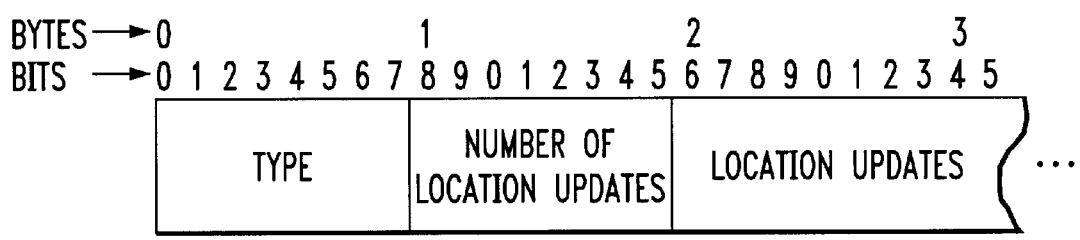

An illustrative format of the Message field of a LUM is shown in FIG. 11B. The type field may be set to 1 to indicate that this is an LUM. The location updates number field represents the number of location updates that are in the message. The maximum number of location updates is determined by the largest IP packet size. However, from the wireless link point of view, the optimal number may be less than the maximum number.

Figure 11C:
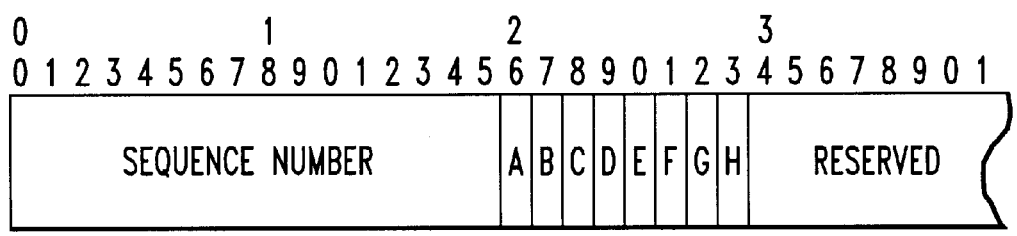
Figure 11C:
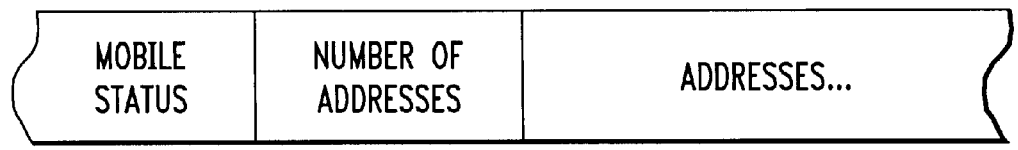

The location update field may contain several updates, one per mobile. The location update field contains a sequence number field, an A–H field, an update source field, a mobile status field, a number of addresses field and an addresses field. An illustrative format of the location update field of an LUM is shown in FIG. 11C.

The Sequence Number is incremented by one each time an initial LUM is sent out. When a mobile or router node is rebooted, the Sequence Number starts from 0. When the Sequence Number reaches the maximum number 0xffff, it starts from 256 to distinguish rolling over from rebooting. If a mobile or a router node receives a sequence number that is less than 256 and less than the previous sequence number from the same node, then the node issuing the sequence numbers is considered to have been rebooted. If a mobile or a router node receives a sequence number that is greater than 255 and less than the previous sequence number from the same node, then the sequence number is considered to have rolled over.

The A–H field includes 8 bits that may be individually set to a 1 in order to have a particular action performed or a function activated. When bit A is set, this allows location message aggregation. When bit B is set, this represents that the sender of the LUM wants confirmation back. When bit C is set, this indicates that forwarding is required. When bit D is set, this represents that buffering is required until the forwarding LIPA of the mobile is known. The 'D' bit can be set only when the 'C' bit is set. Bits EFGH are reserved, that is, set to 0 in the present embodiment.

The update source field represents the source that originates the location update. The information source is specified using the source's LIPA. Often, the source is the sender of the message. When a direct router aggregates the location update messages it receives, then the sender of the aggregate LUM is the router but the update source could be different mobiles connected to the router.

The mobile status field represents the status of the mobile whose location is reported and may take on one of the following values:
Value 1: Unreachable
Value 2: Reachable
Value 3: Sleeping When a mobile is to disconnect from the network, it sets the mobile status field to be unreachable and the lifetime of the status in its LUM. If a mobile decides to enter a save power mode, it may set the mobile status to be sleeping. HLRs and VLRs update their tables correspondingly after receiving the LUM.

The number of addresses field represents the number of addresses included in the location update. For instance, each entry may have a mobile's MID, PIPA and LIPA. There can be multiple LIPAs in one update indicating that the mobile may be in soft handoff. For other types of addresses, there should only be one of each type in an update. Also there should be an address type that can uniquely identify the mobile. For instance, there should be either a MID or a PIPA in an update.

Figure 11D:
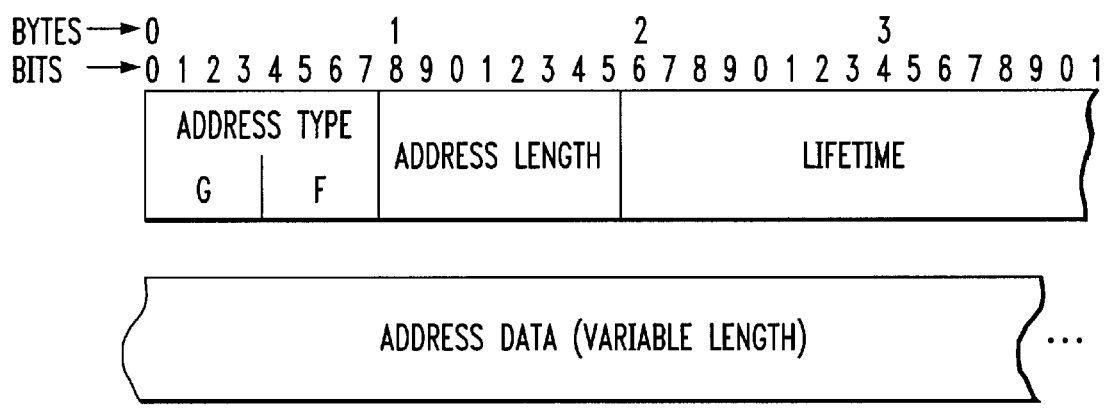

The addresses field may contain multiple addresses for a mobile in a location update. An illustrative format of the addresses field of a LUM is shown in FIG. 11D.

The 'G' and 'F' bits of the address type may take on the same values as defined above with respect to the Address Option (FIG. 9B). In such case, the 'G' bits are set to a value of 0 in this field, while the 'F' bits may take on a value as defined in the Address Option field. The address length field is also as defined in the Address Option field. The lifetime field is as described above and is only present when the address is an LIPA. The address data field contains the actual address of a mobile in any address type defined in the Address Option field.

(ii) Location Confirm Message (LCM). A location confirm message (LCM) is used to confirm receipt of a LUM. An illustrative format of an LCM is shown in FIG. 11N. As shown, the LCM includes the following fields: type; number of location confirms; and location confirms.

The type field may be set to 9 to indicate that this is an LCM. The location confirms number field represents the number of location confirms that are in the message. Each location confirm in the location confirms field represents a location confirm for a mobile. An illustrative format of the location confirms field is shown in FIG. 11P. As shown, a location confirm contains the following fields: sequence number; and update source. The sequence number is copied from the LUM to which the LCM is responding. The update source is also copied from the LUM to which the LCM is responding.

(iii) Location Query Message (LOM). A location query message (LQM) is used to find out the relative location of a mobile which is expressed in terms of the LIPA of the mobile. An LQM can be sent by a mobile or a router. The message can be replied to by an HLR or a router.

The location query message has the following format:(i) IP header with a source field, a destination field and an Address Option field; (ii) UDP header with a source port field, a destination port field and a UDP checksum field; and (iii) Message with a type field, a location queries number field, a location queries field, wherein the location queries field, itself, includes the following fields: sequence number, A–H, query source, mobile status, number of addresses and addresses. Each field will now be explained.

In the IP header, the source field includes the sender's LIPA. The destination field includes the destination or the intermediate destination of the message. It can have values of 0, the LIPA of an HLR, or a router. There are cases where it is preferred that the destination be a router instead of an HLR. A mobile may have multiple queries for different HLRs, in which case, it may aggregate the multiple queries into one location query message and use its direct router's LIPA as the destination. In addition, due to the 40-byte limit of the option field in a preferred embodiment, not every mobile can use the Address Option to specify destination. Instead of finding out the HLR's LIPAs through query, the mobile can use its direct router or any other router's LIPA as destination. At the router, the router extracts queries, looks up the HLR's LIPAs for the queries, sorts the queries by HLRs and forms a new LQM with one or more queries for each HLR.

The Address Option is the same as the IP option defined with respect to the LUM. Likewise, the UDP header is as defined in the LUM.

Figure 11E:
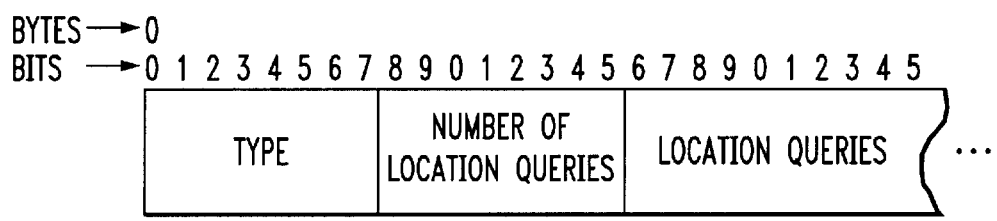

An illustrative format of the Message field of a LQM is shown in FIG. 11E. The type field may be set to 2 to indicate that this is an LQM. The location queries number field represents the number of location queries that are in the message.

Figure 11F:
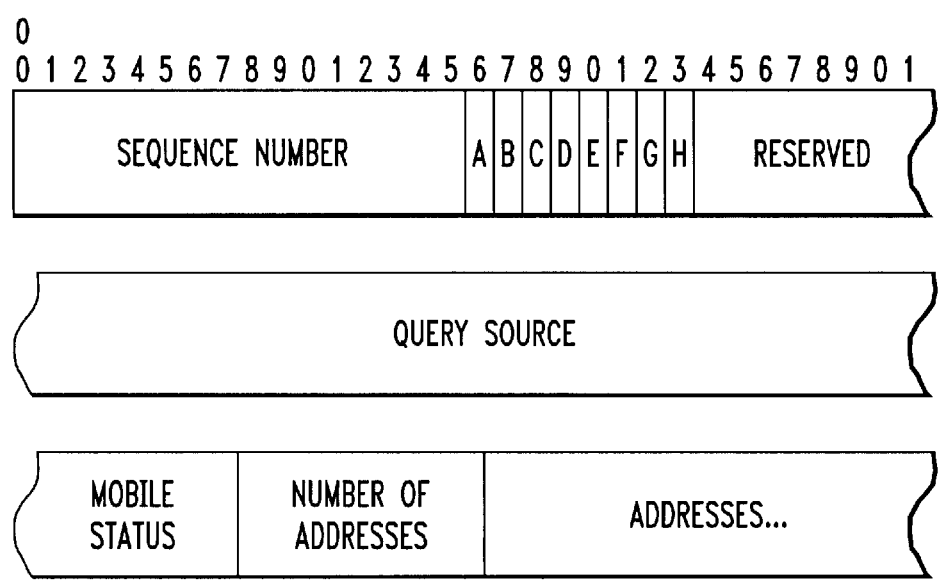

The location query field may contain multiple location queries, but there is one location query per mobile. The location query field contains a sequence number field, an A–H field, a query source field, a mobile status field, a number of addresses field and an addresses field. An illustrative format of the location query field of an LQM is shown in FIG. 11F.

The Sequence Number in the LQM is processed in the same way as described above with respect to a LUM. The A–H field includes 8 bits that may be individually set to a 1 in order to have a particular action performed or a function activated. When bit A is set, this allows location message aggregation. When bit B is set, this represents that paging is desired if the mobile's location is unknown. When bit C is set, this allows that only the VLR or HLR may reply to the message. Bits DEFGH are reserved, that is, set to 0.

The query source field represents the source that originates the location query. The LIPA of the query source is used. The location reply message in response to the LQM should be delivered to this address. A query source may not be the same as the sender of the message. Since the mobile status field represents the status of the mobile whose location is queried, it is given a value of 0 in the LQM. The number of addresses field represents the number of addresses included in the location query, analogous to the similar field in the LUM.

Figure 11G:
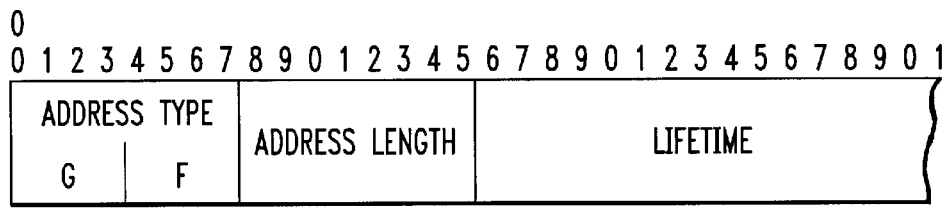
Figure 11G:
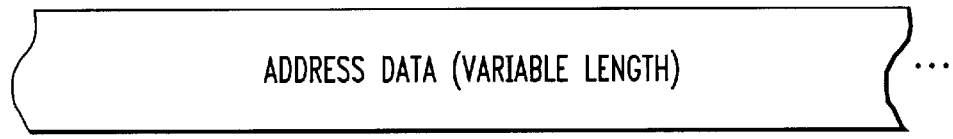

The addresses field may contain multiple addresses for a mobile in a location query. An illustrative format of the addresses field of a LQM is shown in FIG. 11G.

The 'G' bits of the address type may take on one of the following values:

Value 0: Indicates the address field is empty and needs to be filled. Usually the LIPA needs to be filled in the address field.

Value 1: Indicates the address field is filled. Usually, either the PIPA or the MID is filled in here.

The 'F' bits of the address type may take on the same values as defined above with respect to the Address Option (FIG. 9B). The address length field is also as defined in the Address Option field. The lifetime field is as described above and is only present when the address is an LIPA.

The address data field can include all of the address types defined in the Address Option. If the address field has a value of 0 and the 'G' bits of the address type has the value of 0, it means that the address field is unknown and needs to be filled.

Using the LQM, mobile H can ask for the LIPA of mobile I given mobile I's PIPA. In the location query, there are two addresses. One address is mobile I's PIPA which is known and the other address is the LIPA of mobile I, which is to be filled. In the first address, the 'G' bits of the address type can have the value of 1indicating that the address is filled and 'F' bits can have the value of 1 indicating that the address is a PIPA. The second address can have the 'G' bits set to 0 indicating the address needs to be filled and the 'F' bits of the address type set to 0 indicating the address is a LIPA. The Lifetime is set to 0. There is no address data field when the 'G' bits are set to 0.

(iv) Location Reply Message (LRM). Any router or HLR can reply, to a location query message unless otherwise indicated by the 'C' bit in the LQM. The router or the HLR do not need to be the destination node indicated by the LQM.

When a router (often a direct router) receives an LQM with the IP destination set to 0 or to the LIPA of the router, it may search its VLR to see if it can provide the reply. If yes, it sends a location reply message (LRM) to the querying source. If the router does not have such information, the router can forward the message to the relevant HLR. If the LQM has multiple location queries where mobiles' HLRs are different, the router sorts the location queries by HLR and sends an LQM to each HLR. Then, the HLR sends an LRM in response to the query message. However, if the IP destination address of the LQM is set to a valid IP address, such as the HLR's LIPA, then the message is routed like other packets without mobility-related processing at the direct router.

The location reply message has the following format:(i) IP header with a source field and a destination field; (ii) UDP header with a source port field, a destination port field and a UDP checksum field; and (iii) Message with a type field, a location replies number field, a location replies field, wherein the location replies field, itself, includes the following fields: sequence number, A–H, reply source, query source, mobile status, number of addresses and addresses. Each field will now be explained.

In the IP header, the source field is the sender's LIPA, while the destination field is copied from the source IP address of the LQM. The destination may not be where the reply message is to be ultimately delivered.

In the UDP header, the source port field is variable and the destination port is copied from the source port of the location query message. The UDP checksum field is similar to that in the LUM and the LQM.

Figure 11H:
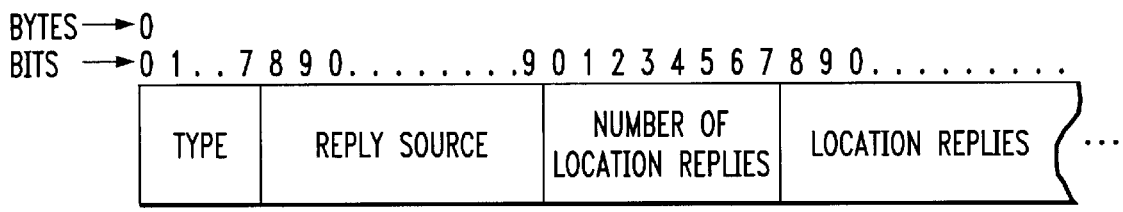

An illustrative format of the Message field of an LRM is shown in FIG. 11H. The type field may be set to 3 to indicate that this is an LRM. The location replies number field represents the number of location replies that are in the message.

Figure 11I:
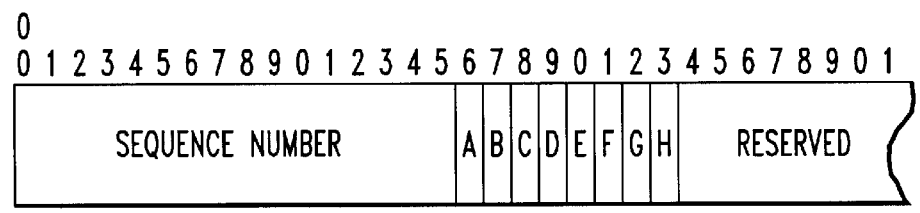
Figure 11I:
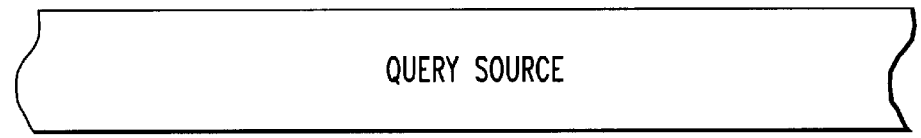
Figure 11I:
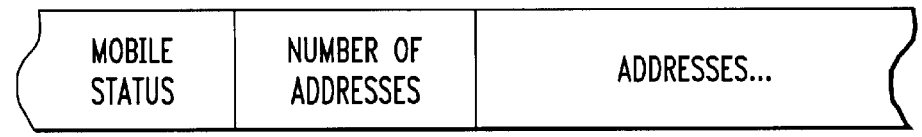

The location reply field contains a location reply from an HLR or a router. For each location reply, the location query is copied from the LQM to the LRM first. The addresses that are requested by the LQM are filled by the network node or the mobile if it knows what the addresses are. Otherwise, the location query is copied in the LRM. The location reply field contains a sequence number field, an A–H field, a reply source field, a query source field, a mobile status field, a number of addresses field and an addresses field. The reply source field indicates the source that originates the LRM. There is only one reply source field for each LRM. The LIPA of the source is used. An illustrative format of the location query field of an LQM is shown in FIG. 11I.

The Sequence Number is copied from the Sequence Number field of the LQM. The A–H field includes 8 bits that may be individually set to a 1 in order to have a particular action performed or a function activated. When bit A is set by the mobile, this allows LRM aggregation. When bit B is set, this represents that the mobile is being paged. If the HLR has the mobile status of location unknown in its HLR table, the HLR may send an LRM to the querying mobile or router informing them that the mobile's location is unknown and it is being paged. Bits CDEFGH are reserved, that is, set to 0.

The query source field is copied from the query source field of the LQM. The query source is where the LRM should be delivered. The query source may not be the same as the destination IP address which only identifies the intermediate destination of the message.

The mobile status field is copied from the HLR table. If the node receiving the LQM is the HLR of the mobile and does not find the mobile's entry in its HLR table, it creates an entry in the table for the mobile with the mobile status set to location unknown. If the node receiving the LQM is not the HLR of the mobile, the node sends an LRM to indicate that it does not have the mobile's information by setting the 'G' bit to 0 in the LRM. The node may also indicate in the LRM that it is not the mobile's HLR by setting the address type field to be either 4 or 5, the address data to be the mobile's LIPA or MID, and the lifetime to 0. The number of addresses field is copied from the same field of the LQM.

Figure 11J:
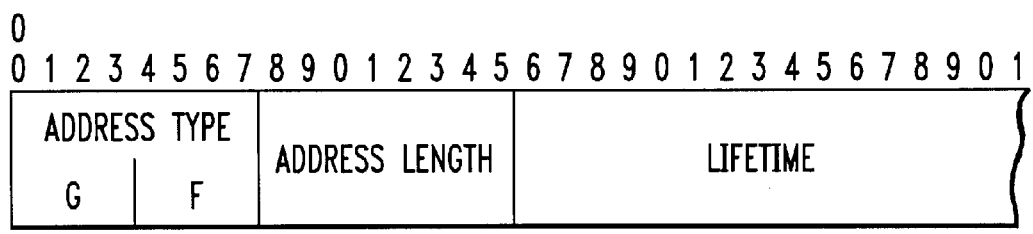

An illustrative format of the addresses field of a LQM is shown in FIG. 11J. When a node replies to an LQM, if the address in the LQM has the 'G' bits of the address type set to 1, then it copies the address directly into the LRM. If the address has the 'G' bits set to 0, indicating that the address is unknown and needs to be filled, it processes the fields of the address in the following way.

The 'G' bits of address type may have the following values:

Value 0: Indicates that the mobile's location is unknown by the replying node and the address field is not filled.

Value 1: Indicates the address field is filled. Usually, the LIPA is filled.

The 'F' bits of address type are copied from the same field from the LQM. The address length field is as defined in the Address Option field. The lifetime field is only present when the address is an LIPA. The lifetime field in the LRM is copied from the HLR or VLR tables, or from other sources such as caches.

The address data field is filled with the address requested in the LQM if the 'G' bits are set to 1. The address data field is omitted if the 'G' bits are set to 0.

(v) Registration Message (RM). RMs are used by a mobile node to request registration with a new router and to request de-registration with the current router to which the mobile is attached. Another node (e.g., a router or mobile) can register on behalf of a mobile.

The registration message has the following format:(i) IP header with a source field and a destination field; (ii) UDP header with a source port field, a destination port field and a UDP checksum field; and (iii) Message with a type field, a length field, a sequence number field, a registration lifetime field, A–H, a mobile status field, a previous LIPA field, a number of addresses field and an addresses field. By the previous LIPA field, we mean the LIPA that the mobile was just using for its previous communication. Each field will now be explained.

In the IP header, the source field includes the LIPA of the node that sends the registration request message. The source address is set to 0.MID if the mobile does not know its direct router's RID yet. If the mobile does know its direct router's RID, then the source address should be set to RID.MID. The destination field is set to 0, since the mobile at this point may not know the RID of the router with which it has established a link. The UDP header is the same as is defined in the LUM.

Figure 11K:
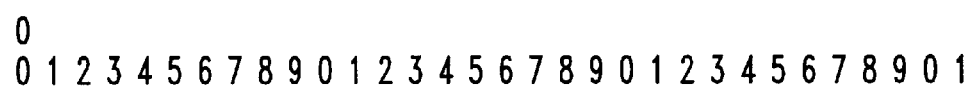

An illustrative format of the Message field of an RM is shown in FIG. 11K. The type field may be set to 6 to indicate that this is an RM. The length field represents the length of the message. The Sequence Number field identifies a particular registration request message. The registration lifetime field indicates the desired lifetime of the registration in the unit of seconds. A value of 0 indicates de-registration. If the lifetime is 0, then the 'ABCDEFGH' bits are set to 0. Otherwise, bit B is set to request the direct router to send a LUM to the mobile's HLR on behalf of the mobile. Bit C is set to request the previous router to forward packets to the current direct router. Bit D is set to allow message aggregation. If bit E is set, the LCM will confirm that confirmation from mobile's HLR for the LUM is desired. Bits AFGH are reserved, that is set to 0.

The mobile status field is used to indicate whether the state of the mobile is active or sleeping after a successful registration. The previous LIPA field represents the LIPA of the router with which the mobile is in direct communication. The number of addresses field indicates the number of addresses that follow this field.

Figure 11L:
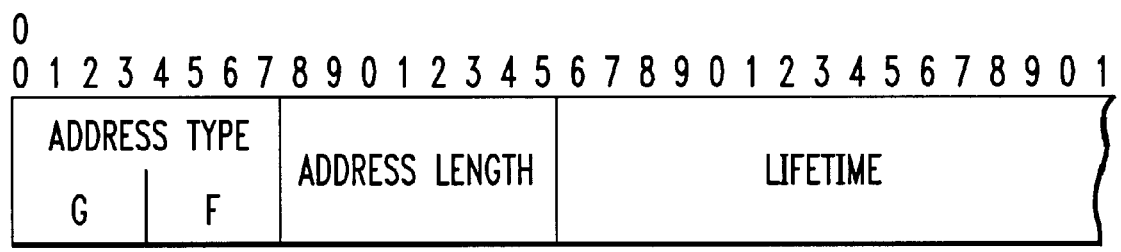
Figure 11L:
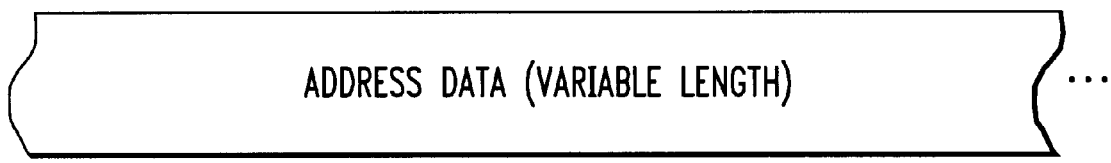

An illustrative format of the addresses field of an RM is shown in FIG. 11L. The addresses include the mobile's ID (MID) and mobile's PIPA. It may also include the IP address(es) of multicast group(s) a mobile may belong to. It should also include the mobile's previous LIPA if the forwarding bit ('B'bit) is set. The last LIPA can be carried in the message by assigning the 'G' bits the value of 0 and 'F' bits the value of 6. Therefore, the address type indicates that the following address data field contains the last LIPA of the mobile. It is to be appreciated that the definitions of the address type, address length, address lifetime and address data is as defined in the LUM.

(vi) Registration Reply Message (RRM). RRMs are used by routers to inform mobiles of their registration status, e.g., successful or not successful. RRMs can also be used by router to request mobiles to re-register with the router.

The registration reply message has the following format: (i) IP header with a source field and a destination field; (ii) UDP header with a source port field, a destination port field and a UDP checksum field; and (iii) Message with a type field, a length field, a sequence number field, a registration lifetime field, A–H, a mobile status field, a number of addresses field and an addresses field. Each field will now be explained.

In the IP header, the source field indicates the LIPA of the direct router. The destination address should be copied from the source LIPA of the RM. The UDP header is defined the same as in the LRM.

Figure 11M:
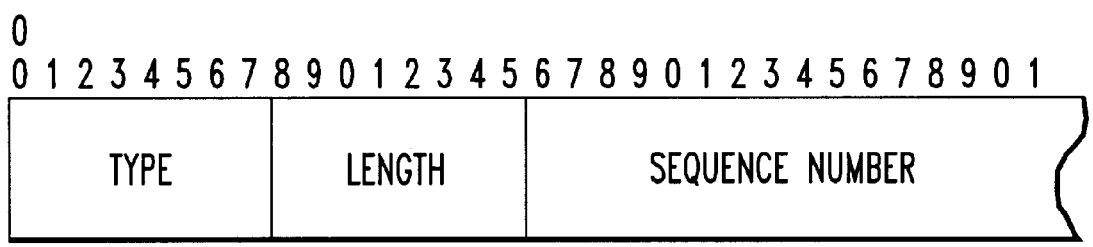
Figure 11M:
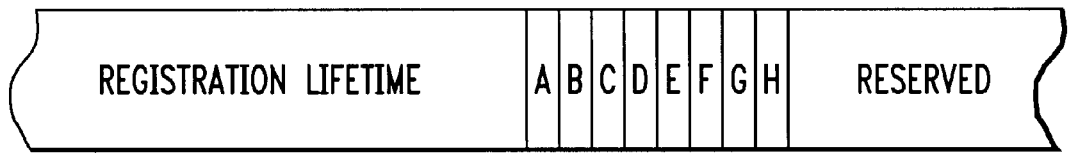
Figure 11M:
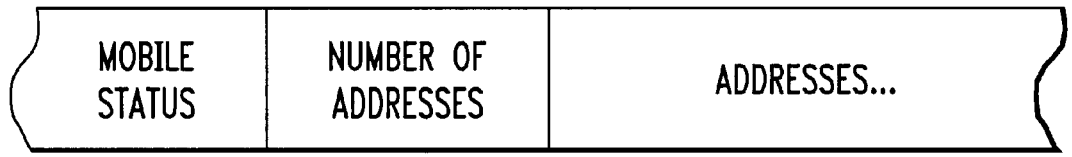

An illustrative format of the Message field of an RRM is shown in FIG. 11M. The type field may be set to 7 to indicate that this is an RRM. The length field represents the length of the message. The Sequence Number is copied from the RM. The lifetime field indicates the permitted lifetime of the registration in the unit of seconds. The router can assign a value no greater than the value given in the RM. A value of 0 indicates that the mobile is de-reg istered by the direct router. The same value of the lifetime is also used in the LUM sent to the mobile's HLR by the mobile or the direct router.

Bit A is set to 1 if the RM is accepted and set to 0 if the RM is denied. If the registration request is accepted, then the following explains what the rest of the message means. Recall that, in the RM, setting of the following bits has the following effect. Bit B is set to send a location update message to the mobile's HLR on behalf of the mobile. Bit C is set to request the previous router to forward packets to the current direct router. Bit D is set to allow message aggregation. Bit E is set to confirm the LUM. Bits FGH are reserved, that is, set to 0. In the RRM, these same bits are set accordingly (i.e., the same as in the RM) to confirm that they were set in the RM.

The mobile status field is copied from the RM. The number of addresses field is set to 1 plus the number of addresses from RM. The addresses field is copied from the RM. A new LIPA is also added by the direct network node to indicate the mobile's new LIPA.

RM is also used for terminating registration and bit B can be used for this purpose. Bit B is set to indicate all packets will be discarded until re-registration is completed success-fully. If the registration request is denied, then the message is structured in the following way. Bits CDEFGH indicate reasons for denying the registration request. The bits may take on various values indicating the reason, for example: Value 5: UDP checksum error; Value 6: No more capacity; Value 7: Invalid MID; Value 8: Invalid PIPA; Value 9: Invalid RID; Value 10: Invalid address; Value 11: UDP port unreachable; Value 12: Poorly formed request. The lifetime field indicates how long the mobile has to wait before a retry. If lifetime is set to 0, it requests an immediate re-registration. The Sequence Number, the mobile status, the number of addresses and addresses are copied from the RM.

C. Location Management

Figure 12C:
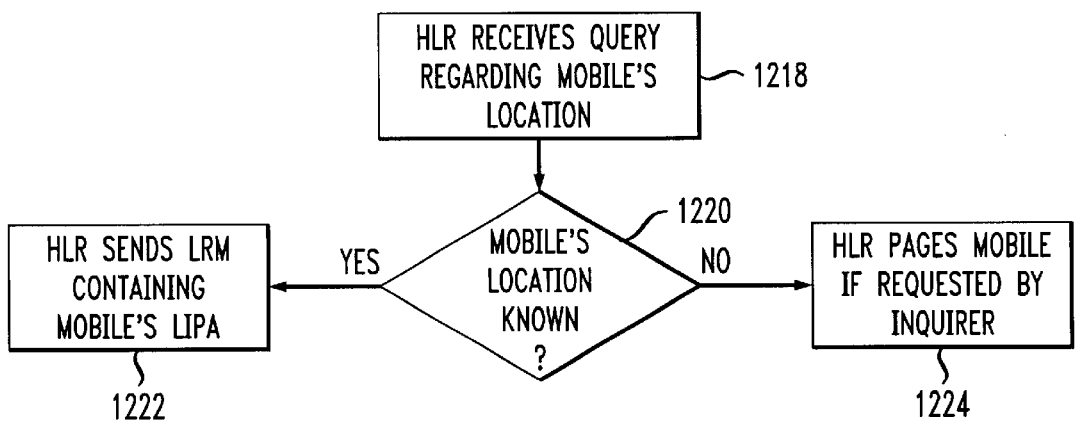

Location management is responsible for tracking the location of the mobiles and searching for the mobiles when the location of the mobile is unknown. FIGS. 12A through 12C illustratively depict some of the processes associated with location management according to the invention.

As shown in FIG. 12A, when a mobile powers on (step 1202), it first registers with its direct network node (step 1204). Then the mobile, or the network node it registers with, sends an LUM to its HLR informing its HLR of the mobile's current location (step 1206). The HLR maintains the mobile's location, status and other information in the HLR table. If the mobile changes its location or the mobile status changes, the mobile or its direct node (router) updates its HLR with an LUM as soon as possible (step 1208).

As shown in FIG. 12B, when any network node or any mobile realizes that the location information on a mobile given by its HLR is not correct, it must inform the HLR of the mobile by sending an LUM (step 1210). If the LIPA in the LUM has a lifetime of 0, it indicates that the LIPA is invalid. When the HLR receives such information, it can do one of two things depending on whether the sender is a trusted entity (step 1212). "Trusted" can mean one of two things. First, a "trusted" entity is one that is authenticated, i.e., believed to be who he says he is. Second, a "trusted" entity is one that is authorized, i.e., believed to have the authority to do certain things. The HLR can accept the information and update its HLR table if the sender of the LUM is a trusted entity (step 1214). The other alternative is that the HLR can also confirm the information by sending an LQM to the mobile in question before fully accepting the information if the source of the sender of the LUM is not to be trusted (step 1216).

As shown in FIG. 12C, when an HLR is queried about its mobile's location (step 1218), if the location is known (step 1220), the HLR replies with an LRM containing the mobile's LIPA (step 1222). If the HLR does not know the mobile's location, it has the choice of paging the mobile if requested by the inquiring mobile (step 1224).

D. Mobile Access

A mobile has basically two ways of initiating communications with another mobile in the network 100. First, the initiating mobile (mobile H) can query for the location of the correspondent mobile (mobile I) and obtain the LIPA of mobile I. This method is termed mobile access without triangle routing (also complete access). Using the LIPA as the destination, mobile H can then communicate with mobile I. In the second method, termed mobile access with triangle routing, mobile H does not need to find the LIPA of mobile I before initiating communications with mobile I. Mobile H simply sends the data packets to the destination which is identified by mobile I's PIPA or MID. These mobile access methods are described in detail below.

Figure 13A:
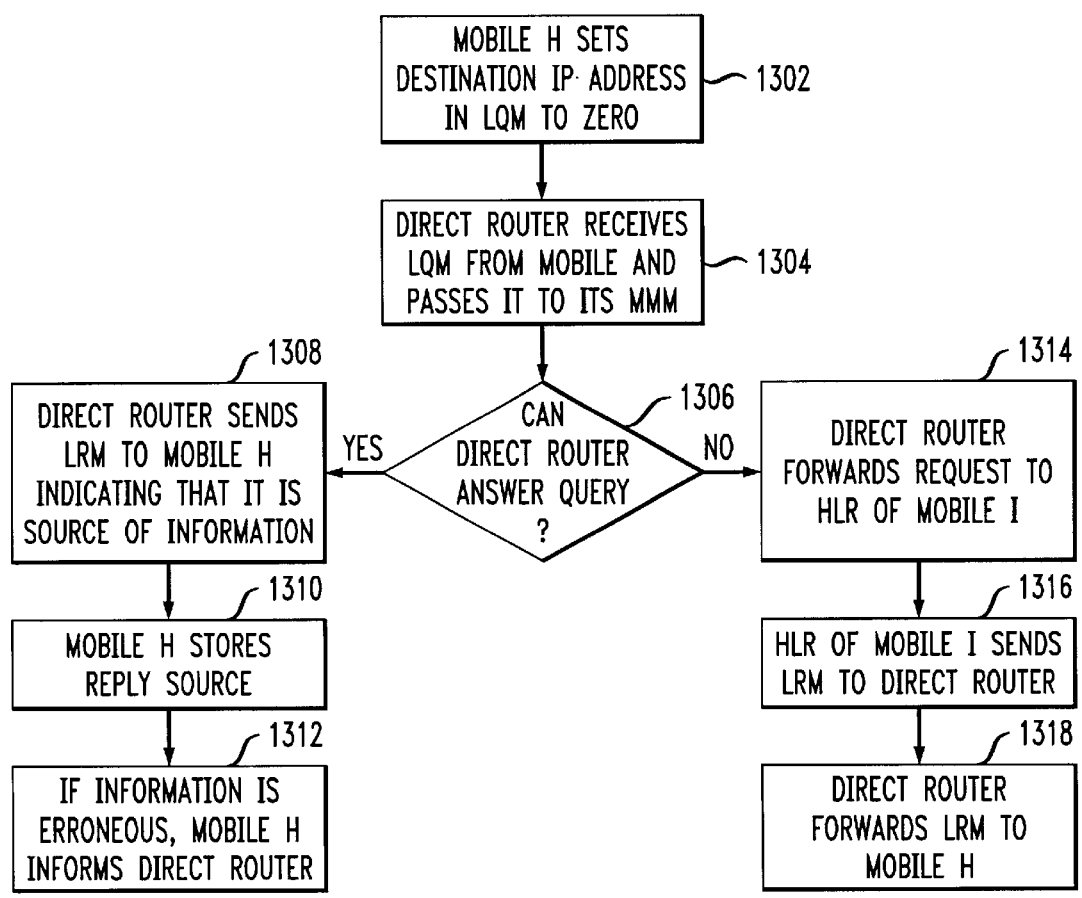
FIGS. 13A and 13B are flow diagrams illustrating exemplary mobile access techniques according to the present invention.

(i) Mobile Access Without Triangle Routing With this mobile access method, as illustrated in FIG. 13A, a mobile (mobile H) needs to find the LIPA of another mobile (mobile I) before mobile H can communicate directly with mobile I. If mobile H has the HLR's LIPA of mobile I, it can send an LQM direct to the HLR and the HLR will reply directly to mobile H's query. Most likely, mobile H does not have such information. Therefore, mobile H sets the destination IP address to 0 and uses the Address Option field to indicate that the destination of the LQM is the HLR of mobile I. If mobile H can not use the Address Option field or if mobile H has multiple queries for different HLRs, then the simplest thing for the mobile to do is to set the destination IP address to 0 (step 1302).

When an LQM arrives at the direct router with the destination IP address set to 0, the LQM is immediately passed on to the mobility management module (MMM). The MMM first checks if it can answer some of the queries itself by looking up its VLR (step 1304). If yes, it sends an LRM to mobile H (step 1306). The reply source field of the LRM indicates that the direct router is the source of the location information of mobile I, not HLR. Mobile H stores the reply source (step 1310). In case such location information is erroneous, mobile H can inform the reply source of the error (1312). If the direct router does not have an entry for mobile I in its VLR, then it looks up the LIPA of mobile I's HLR, replaces the destination address with the LIPA of mobile I's HLR and forwards the message to the HLR (step 1314). The direct router may also sort the queries by HLR and form an aggregate LQM for each HLR. The HLR of mobile I sends an LRM to the router directly (step 1316). The LRM includes the reply source of the LRM which is the HLR and the query source which is the final destination of the LRM. The direct router then changes the IP header of the LRM and delivers it to mobile H (1318).

Figure 13B:
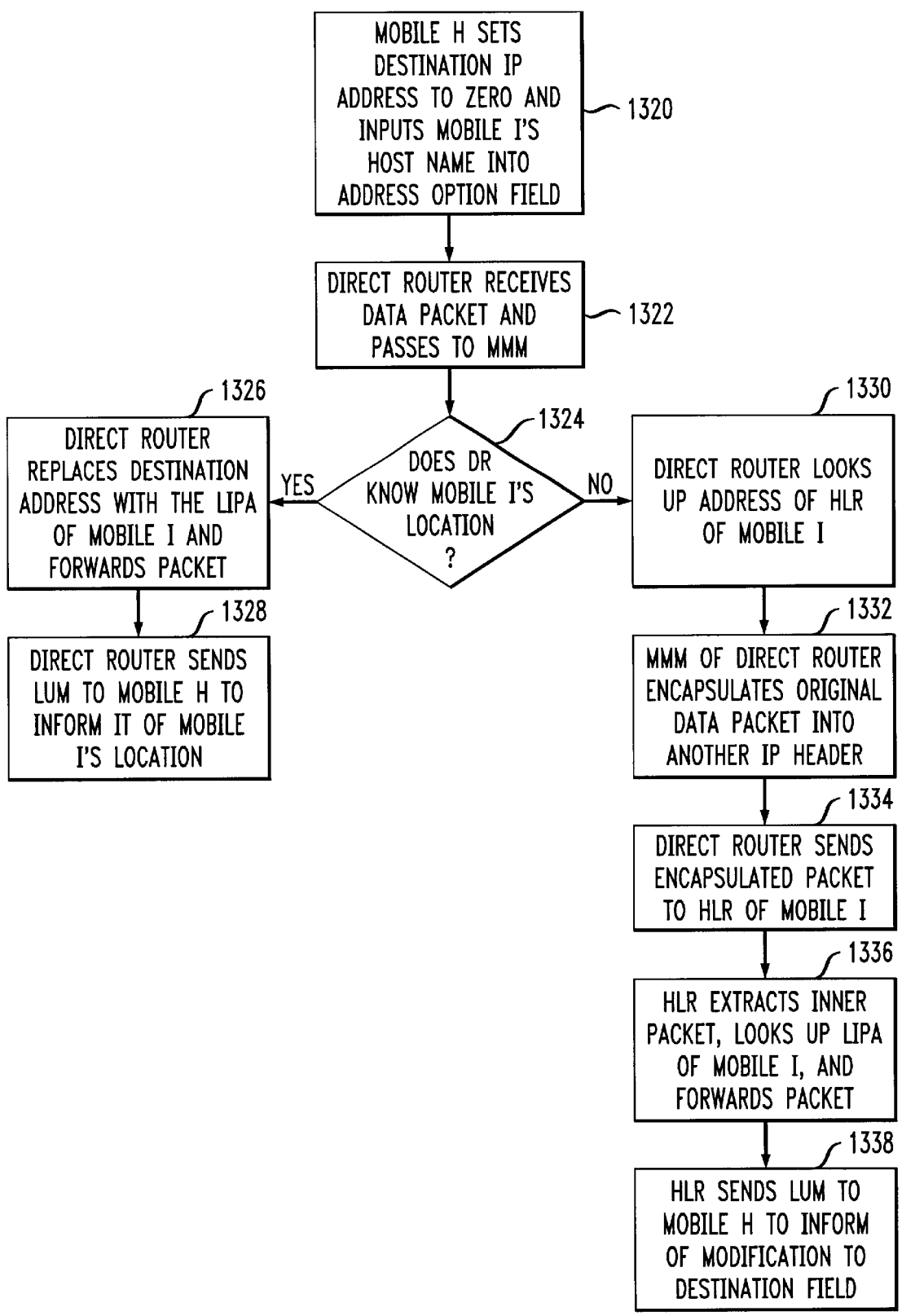

(ii) Mobile Access With Triangle Routing. With this mobile access method, as illustrated in FIG. 13B, mobile H can send the data packets directly to mobile I without first querying for the LIPA of mobile I. Mobile H sets the destination IP address to 0. When the direct router receives the data packet with destination set to 0, it passes the packet to its MMM (step 1322). The MMM examines the PIPA destination field. The MMM extracts the PIPA of the destination which is mobile I. The router first checks its VLR and/or cache to see if it knows mobile I's location (step 1324). If yes, it replaces the destination of 0 with mobile I's LIPA and forwards the packet (step 1326). The router also sends an LUM to mobile H informing it of mobile I's location (step 1328). If the router does not have any information on mobile I, it looks up mobile I's HLR address (step 1330). The MMM then encapsulates the original data packet in another IP header (step 1332). The source address of the outer IP header is set to the router's LIPA, and the destination address is set to the HLR's LIPA. MMM passes the packet back to the forwarding module of the direct router which routes the packet to the HLR (step 1334).

The HLR extracts the inner IP packet and looks up mobile I's LIPA in its HLR table. The HLR replaces the destination of 0 with the mobile I's LIPA and then forwards the packet to mobile I (step 1336). Since HLR modified the destination field, it needs to inform the source of the inner IP header by sending mobile H an LUM (step 1338).

When the packet arrives at mobile I, mobile I may send data datagrams to mobile H. Upon receiving the packets, mobile H knows that the communication with mobile I is initiated. If mobile H receives an ICMP indicating host unreachable, it sends an LUM to either the direct router or the HLR depending who last issued the LUM to it.

E. In-call Mobility Management

When mobiles communicate with each other in the network 100, they use the most current LIPAs as source and destination addresses in their IP header. If a mobile moves and obtains a new LIPA, it uses the new LIPA as source address in all subsequently transmitted packets.

After a mobile registers with a new router, it may send a location update message to its HLR or ask its direct router to do so on its behalf. The mobile also informs the hosts with which the mobile maintains active communications using either an explicit or an implicit location update, as will be explained below. Such a list of hosts may include the hosts with which the mobile has, for example, TCP/IP connections, voice or video connections, and active UDP/IP sessions.

Figure 14A:
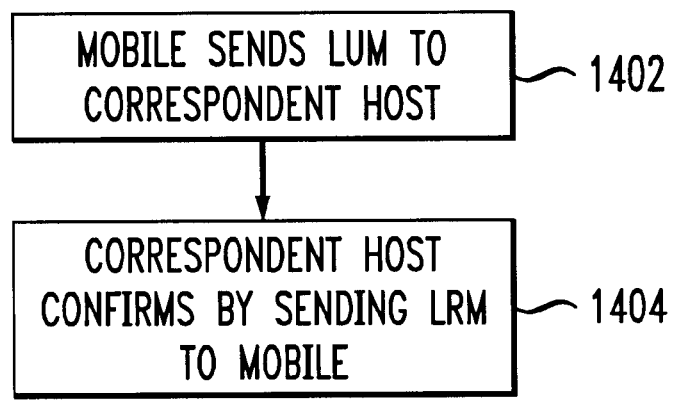
FIGS. 14A and 14B are flow diagrams illustrating exemplary in-call mobility management techniques according to the present invention.

(i) Explicit Location Update. As shown in FIG. 14A, to update its new location with a correspondent host, a mobile sends a LUM to the correspondent host (step 1402) which in turn confirms the reception of the message by sending an LCM to the mobile (step 1404).

Figure 14B:
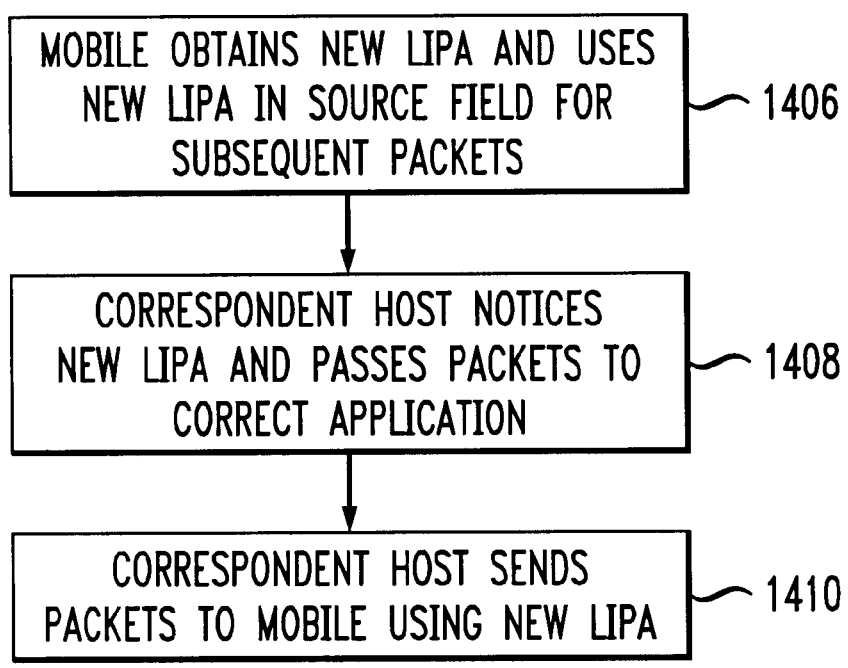

(ii) Implicit Location Update. A mobile's location information is implicitly sent to the correspondent host in the source IP address field of the data packets. When the mobile has active communication with its correspondent host and the mobile has packets to send within a short period of time, then implicit update method can be used. As shown in FIG. 14B, the implicit update works in the following way. When the mobile changes its location and obtains a new LIPA, it uses its new LIPA in the source IP address field of the subsequent data packets sent to the correspondent host (step 1406). When the correspondent host receives such packets, it notices that the source IP address has changed (step 1408). However, since each LIPA is composed of two parts: RID and MID, the correspondent host can still recognize from the unique MID that the packets came from the same mobile. Thus the correspondent host can immediately pass the packets to the right application without any delay. Otherwise, the correspondent host has to either discard the packets whose source address can not be recognized or buffer the packets and wait for a signaling message indicating that the new source IP address represents the same mobile. This example shows the clear advantage of structuring the LIPA in terms of RID and MID. The structure greatly facilitates mobility management. The correspondent host will start using the new LIPA (step 1410).

Figure 15A:
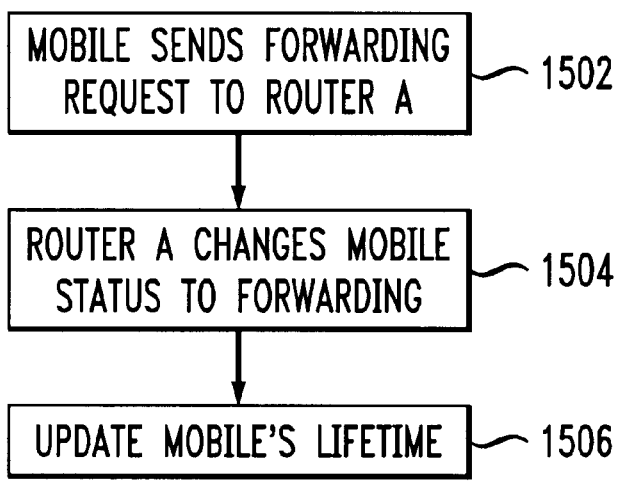
FIGS. 15A through 15C are flow diagrams illustrating exemplary forwarding and buffering techniques according to the present invention.
Figure 15B:
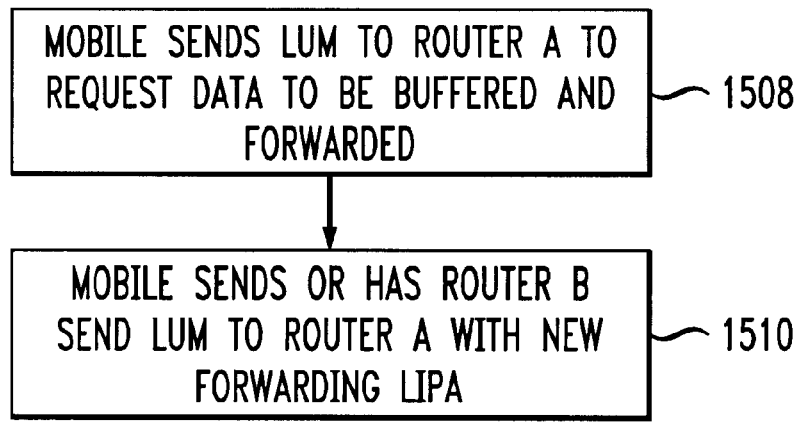
Figure 15C:
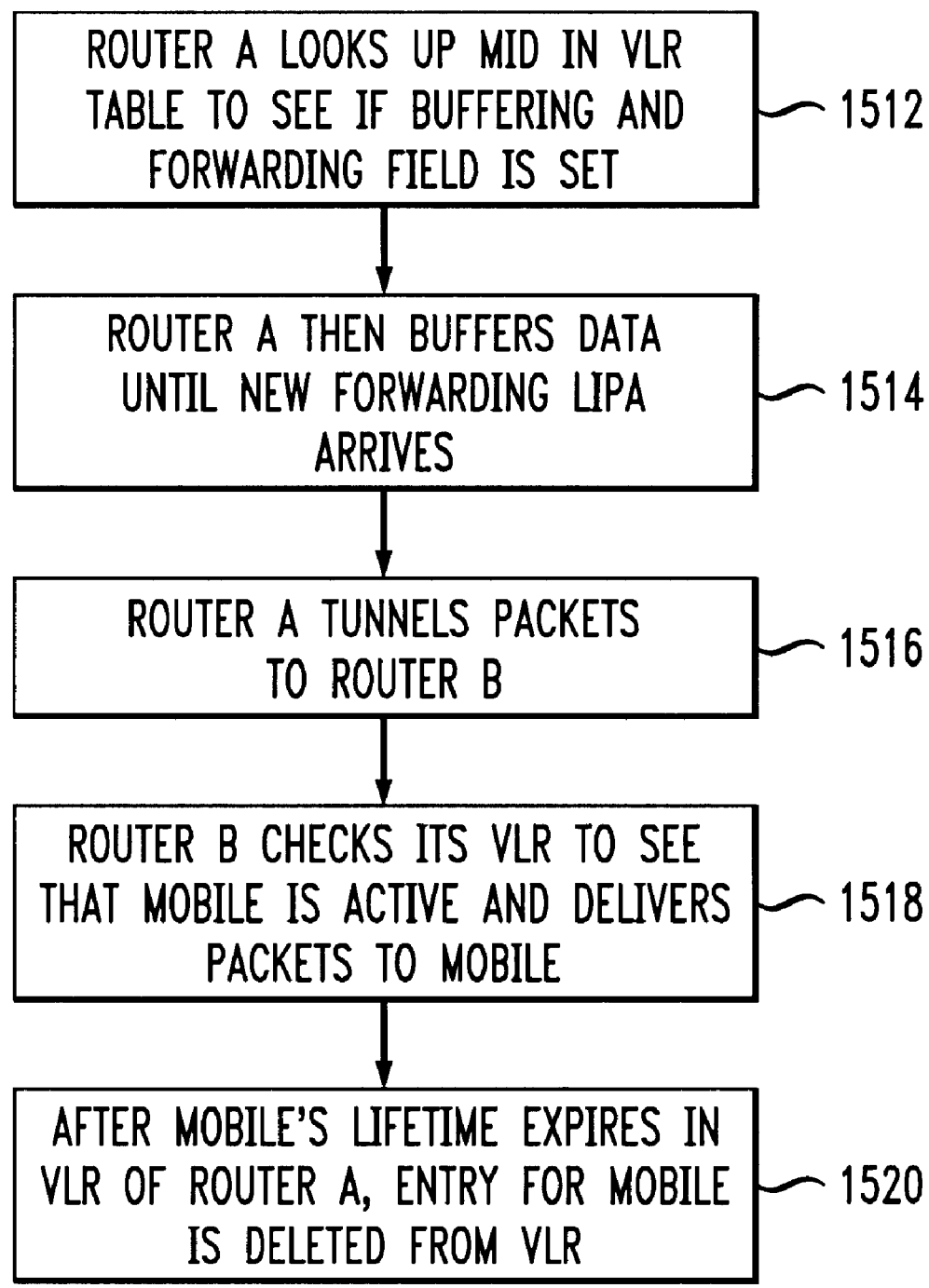
Figure 16A:
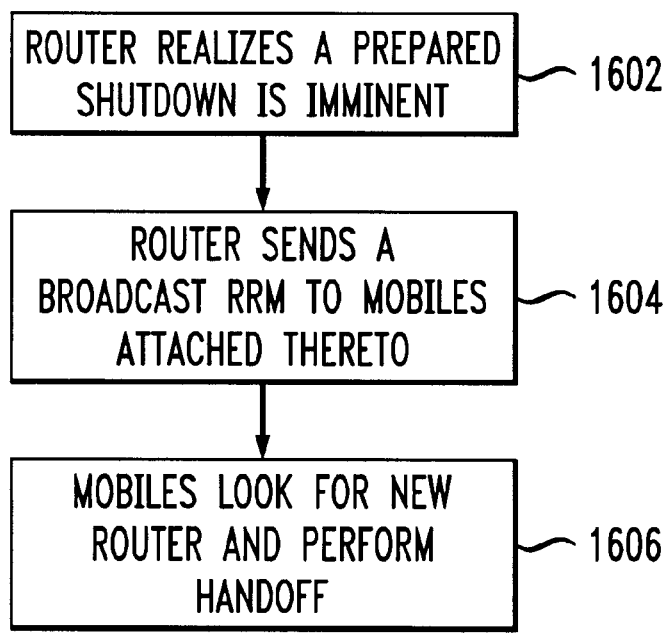
FIGS. 16A and 16B are flow diagrams illustrating exemplary direct router failure management techniques according to the present invention.
Figure 16B:
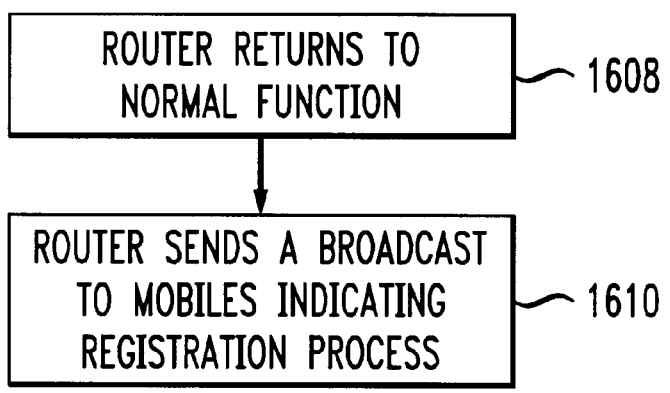

(iii) Packet Forwarding and Buffering by the Previous Router. As shown in FIGS. 15A through 15C, when a mobile moves from router A to router B, it may want router A to forward transient packets from router A to router B. The forwarding request is made by setting the 'C' bit in an LUM (step 1502). The mobile may ask router A to forward to router B before the mobile disconnects from router A, or it may ask router B to do so on its behalf after it connects with router B. Upon receiving such a request, router A updates its VLR by changing the mobile status to forwarding (step 1504). The lifetime of the mobile's status is updated as well (step 1506). When the mobile status field has the value of forwarding, there is an extra field: mobile's new LIPA, to indicate where packets should be forwarded.

In addition, a mobile may also want router A to buffer the transient data packets before the data datagrams can be forwarded. Before leaving router A, the mobile sends an LUM indicating that the current LIPA is going to be invalid and that it wants the router to buffer and forward the data packets (step 1508). When the mobile arrives at router B, it sends another LUM or asks router B to send an LUM on its behalf to router A informing router A of its new forwarding LIPA (step 1510).

In general, when a transient packet arrives at router A, if the RID part of the destination IP address matches router A's RID, it extracts the MID part of the address. Router A then looks up the MID in its VLR table, and sees that the mobile status is forwarding and the buffering field is set (step 1512). Router A starts to buffer the data until the forwarding LIPA arrives (step 1514). Router A then knows to redirect the packet to router B (step 1516) by replacing router A's ID with router B's ID in the destination LIPA field. At router B, the destination address field of the inner IP header is examined. Using the MID part of the address, router B checks its VLR and finds that the mobile with the MID has a status of active. Router B then delivers the packet to the mobile directly (step 1518). After the lifetime expires in the VLR of router A, the entry for the mobile in router A's VLR is deleted (step 1520).

(VII) Direct Router Failure for IPv4 Implementation

In a prepared router shut down (step 1602), the direct router sends a broadcast RRM to the mobiles attached to it before shutting down (step 1604). The destination address of the broadcast RRM is set to RID.0xfffff The router sets the 'A' bit in the message to 0, the lifetime to infinity, and the time-to-live field to 1. A time-to-live field is a field commonly specified in an IP header. The time-to-live field is a standard field in an IP Leader. Mobiles, upon receiving the message, know that they need to be prepared to switch to other routers since their registrations are denied by the direct router. So, they start to listen to adjacent routers and try to establish links with adjacent routers (step 1606). In the meantime, they can still try to continue transmitting data over the link with the current router if the 'B' bit is not set in the RRM. Otherwise, the mobiles stop transmitting data immediately. Once a mobile detects that a link with an adjacent router can be established, then it performs a handoff.

If the direct router has a failure for which it has not prepared (i.e., did not send a broadcast RRM), the mobiles will detect that there is no signal coming from the direct router. Mobiles then start searching for other channels from adjacent routers. If there are channels available from the adjacent routers, mobiles perform handoffs to these routers.

After the router returns to normal function (step 1608), the router sends a broadcast RRM out of the interface where mobiles are directly attached (step 1610). The RRM has the 'A' bit set to 0, the lifetime set to 0 and the time-to-live field set to 1. The destination address of the RRM is 0xfff.0xfffff If the router sets the 'B' bit, it means that data traffic from a mobile or to a mobile will be discarded until the mobile re-register successfully with the router. If the 'B' bit is not set, it means that the mobiles may still continue transmitting and receiving data but they must register within 'n' minutes. It is to be appreciated that 'n' could be on the order of 5 minutes, for example. If a mobile does not register after the timer expires, data traffic for the mobile will be discarded. Upon receiving this message, the mobiles will cease their current data transmission and start to re-register if the 'B' bit is set. If the 'B' bit is not set, the mobiles continue their data transmission and continue to receive data from the router. In the meantime, the mobiles recognize that this is a broadcast message. In order not to overload the system, the mobiles select a random time to wait before the first re-registration attempt. The waiting time is uniformly distributed over the n minute time interval. If this is a unicast message, the mobile receiving the message does not wait before a re-registration attempt. After the first failed re-registration attempt, the mobiles follow the registration retransmission procedure, described below.

(VIII) Registration Retransmission for IPv4 Implementation

A mobile keeps an estimate of the round-trip time of a registration. After each retransmission failure, the mobile uses an exponential backoff algorithm, such as may be known in the art, to decide when it should attempt a retry. One example of a backoff algorithm that may be used is the Ethernet backoff algorithm. A maximum of 15 retransmissions are allowed. If k is the number of retransmissions, the mobile select an integer j which is uniformly distributed between 0 and $2^{m-1}$ and m is the minimum of k and 10. Integer j multiplied by a base backoff time is the time the mobile needs to wait before the next retransmission. The base backoff time is often chosen to be the multiples of estimated round-trip time of a registration.

(IX) Quality of Service for IPv4 Implementation

The data packets in the network 100 may be routed and forwarded in accordance with known IP packet routing techniques. The QoS management of these datagrams may be performed by intermediate routers. The routers may employ technologies which include integrated and differentiated services, fair weighted queuing, and per-flow QoS. Note that since a LIPA not only provides the location of a mobile but also uniquely identifies a mobile, a flow based on the source and destination addresses can be identified by all the routers in the network, thus enabling per-flow based QoS management. With the MID part of a LIPA, QoS management by intermediate routers at this granularity can be easily done.

Some packets (e.g., datagrams with an Address Option, or datagrams with destination address equal to 0) are not forwarded as normal IP packets. Instead, they go through the mobility management module of a router which may be a slower path. For packets going through the MMM, only best-effort service is provided. Fortunately, these packets are mostly either MMCMs or data packets during the mobile access phase. During the mobile access phase, the QoS has not been negotiated. Therefore, in general, packets going through the MMM do not contribute to the degradation of QoS of the network. Instead, these packets are used to facilitate mobility management such as reducing signaling overhead and shortening mobile access time.

For mobile access, two mobile access methods are provided for applications with different needs. For instance, long-duration real-time applications may choose to use the mobile access method without triangle routing while the mobile access method with triangle routing may incur the shorter mobile access time for bursty applications such as TELNET.

Handoff management of an active mobile is essential to managing QoS in the network. The proposed mobility management protocol provides packet forwarding and buffering to ensure minimal datagram loss and delay. In addition, the combination of implicit and explicit location update mechanisms provides the fastest location updates to the correspondent mobiles so that the handoff transition time is minimized.

Although illustrative embodiments of the present invention have been described herein with reference to the accompanying drawings, it is to be understood that the invention is not limited to those precise embodiments, and that various other changes and modifications may be affected therein by one skilled in the art without departing from the scope and spirit of the invention.

What is claimed is:

1. A method of managing mobility associated with one or more mobile user stations and one or more mobile network nodes in an Internet Protocol (IP) based communications system, comprising the steps of:

generating a location update message including a temporary location IP address representing a new location associated with a mobile user station that has moved or plans to move from a coverage area of one network node to a coverage area of another network node, wherein the temporary location IP address is a combination of an identifier of the mobile user station and an identifier of a network node in the communications system with which the mobile user station is currently associated, and wherein the location update message includes an IP header field, a UDP header field and a message field; and sending the location update message to at least one of a mobile user station and a network node in the communications system.

2. The method of claim 1, wherein the location update message is generated by the mobile user station that has moved or plans to move from a coverage area of one network node to a coverage area of another network node.

3. The method of claim 1, wherein the location update message is generated by the network node with which the mobile user station is currently associated.

4. The method of claim 3, wherein the network node aggregates multiple location update messages to be sent to a common home location register.

5. The method of claim 1, wherein the location update message is generated by a home location register associated with the mobile user station that has moved or plans to move from a coverage area of one network node to a coverage area of another network node.

6. The method of claim 1, wherein the IP header field includes at least one of a source field and a destination field.

7. The method of claim 1, wherein the UDP header field includes at least one of a source port field, a destination port field and a UDP checksum field.

8. The method of claim 1, wherein the message field includes at least one of a type field, a location updates number field and a location update field.

9. The method of claim 8, wherein the location update field includes at least one of a sequence number field, a function activation field, an update source field, a mobile status field, a number of addresses field and an addresses field.

10. The method of claim 1, further comprising the steps of:

generating a location confirm message in response to receipt of a location update message; and sending the location confirm message to the mobile user station or network node that generated the location update message.

11. The method of claim 10, wherein the location confirms message includes at least one of type field, a location confirms number field and a location confirms field.

12. The method of claim 11, wherein the location confirms field includes at least one of a sequence number field and an update source field.

13. The method of claim 1, wherein the IP-based communications system is an IPv4-based communications system.

14. A method of managing mobility associated with one or more mobile user stations and one or more mobile network nodes in an Internet Protocol (IP) based communications system, comprising the steps of:

generating a location query message to determine a temporary location IP address representing a location associated with a mobile user station in the communications system, wherein the temporary location IP address is a combination of an identifier of the mobile user station and an identifier of a network node in the communications system with which the mobile user station is currently associated, and wherein the location query message includes an IP header field, a UDP header field and a message field; and sending the location query message to at least one network node in the communications system.

15. The method of claim 14, wherein the location query message is generated by a mobile user station.

16. The method of claim 14, wherein the location query message is generated by a network node.

17. The method of claim 16, wherein the network node aggregates multiple location query messages to be sent to a common home location register.

18. The method of claim 14, wherein the IP header field includes at least one of a source field and a destination field.

19. The method of claim 14, wherein the UDP header field includes at least one of a source port field, a destination port field and a UDP checksum field.

20. The method of claim 14, wherein the message field includes at least one of a type field, a location queries number field and a location queries field.

21. The method of claim 20, wherein the location queries field includes at least one of a sequence number field, a function activation field, a query source field, a mobile status field, a number of addresses field and an addresses field.

22. The method of claim 14, further comprising the steps of:

generating a location reply message in response to receipt of a location query message; and sending the location reply message to the mobile user station or network node that generated the location query message.

23. The method of claim 22, wherein the location reply message includes an IP header field, a UDP header field and a message field.

24. The method of claim 23, wherein the IP header field includes at least one of a source field and a destination field.

25. The method of claim 23, wherein the UDP header field includes at least one of a source port field, a destination port field and a UDP checksum field.

26. The method of claim 23, wherein the message field includes at least one of a type field, a reply source field, a location replies number field and a location replies field.

27. The method of claim 26, wherein the location replies field includes at least one of a sequence number field, a function activation field, a query source field, a mobile status field, a number of addresses field and an addresses field.

28. The method of claim 14, wherein the IP-based communications system is an IPv4-based communications system.

29. A method of managing mobility associated with one or more mobile user stations and one or more mobile network nodes in an Internet Protocol (IP) based communications system, comprising the steps of:

generating a registration message to request at least one of de-registration of a mobile user station with a current network node and registration of the mobile user station with a new network node, wherein the registration message is a request to: (i) allow the mobile user station to use an identifier of the network node as part of a temporary location IP address; and (ii) route packets destined to and from the mobile user station via the network node, and wherein the registration message includes an IP header field, a UDP header field and a message field; and sending the registration message to the appropriate network nodes in the communications system.

30. The method of claim 29, wherein the registration message is generated by the mobile user station seeking at least one of de-registration and registration.

31. The method of claim 29, wherein the registration message is generated by a mobile user station other than the mobile user station seeking at least one of de-registration and registration.

32. The method of claim 29, wherein the registration message is generated by a network node in the communications system.

33. The method of claim 29, wherein the IP header field includes at least one of a source field and a destination field.

34. The method of claim 29, wherein the UDP header field includes at least one of a source port field, a destination port field and a UDP checksum field.

35. The method of claim 29, wherein the message field includes at least one of a type field, a length field, a sequence number field, a registration lifetime field, a function activation field, a mobile status field, a previous temporary location IP address field, a number of addresses field and an addresses field.

36. The method of claim 29, further comprising the steps of:

generating a registration reply message in response to receipt of a registration message; and sending the registration reply message to the mobile user station or network node that generated the registration message.

37. The method of claim 36, wherein the registration reply message includes an IP header field, a UDP header field and a message field.

38. The method of claim 37, wherein the IP header field includes at least one of a source field and a destination field.

39. The method of claim 37, wherein the UDP header field includes at least one of a source port field, a destination port field and a UDP checksum field.

40. The method of claim 37, wherein the message field includes at least one of a type field, a length field, a sequence number field, a registration lifetime field, a function activation field, a mobile status field, a number of addresses field and an addresses field.

41. The method of claim 36, wherein a registration reply message is broadcast to one or more mobile user stations to indicate a network node-related shutdown.

42. The method of claim 29, wherein the IP-based communications system is an IPv4-based communications system.

* * * * *